(12) United States Patent
Williams et al.

(10) Patent No.: US 10,904,696 B2
(45) Date of Patent: Jan. 26, 2021

(54) EMERGENCY PREPARATION AND RESPONSE SYSTEMS AND RELATED METHODS

(71) Applicant: Vi-Ability, LLC, Ellicott City, MD (US)

(72) Inventors: Patrick F. Williams, Ellicott City, MD (US); Sarah B. Smith, Glenview, IL (US)

(73) Assignee: Vi-Ability, LLC, Ellicott City, MD (US)

( * ) Notice: Subject to any disclaimer, the term of this patent is extended or adjusted under 35 U.S.C. 154(b) by 0 days.

(21) Appl. No.: 16/250,840

(22) Filed: Jan. 17, 2019

(65) Prior Publication Data

US 2019/0230467 A1 Jul. 25, 2019

Related U.S. Application Data

(60) Provisional application No. 62/619,571, filed on Jan. 19, 2018.

(51) Int. Cl.
| | |
|---|---|
| *H04W 4/02* | (2018.01) |
| *G08B 25/01* | (2006.01) |
| *H04W 4/024* | (2018.01) |
| *G08B 7/06* | (2006.01) |
| *H04W 4/90* | (2018.01) |
| *H04L 29/08* | (2006.01) |
| *G01C 21/34* | (2006.01) |
| *G08B 25/00* | (2006.01) |

(52) U.S. Cl.
CPC ............ *H04W 4/023* (2013.01); *G01C 21/34* (2013.01); *G08B 7/066* (2013.01); *G08B 25/00* (2013.01);

(Continued)

(58) Field of Classification Search
CPC ....... H04W 4/023; H04W 4/024; H04W 4/90; H04W 4/02; H04L 67/26; H04L 67/306; G08B 25/00; G08B 25/016; G08B 7/066
(Continued)

(56) References Cited

U.S. PATENT DOCUMENTS 9,628,950 B1 * 4/2017 Noeth .................... H04W 4/12
9,679,467 B2 * 6/2017 Hibbs, Jr. ............. G08B 25/12
(Continued)

OTHER PUBLICATIONS

Listing of Emergency Preparedness Resources, published in the U.S. at least as early as Jun. 28, 2018.

*Primary Examiner* — Quan-Zhen Wang
*Assistant Examiner* — Mancil Littlejohn, Jr.
(74) *Attorney, Agent, or Firm* — Law Office of Paul B. Johnson; Paul B. Johnson

(57) ABSTRACT

An emergency preparation and response method includes providing one or more databases communicatively coupled with a first computing device. One or more admin user interfaces are displayed on the first computing device with input fields for storing emergency types and one or more emergency descriptions in the database(s) and associating each emergency type with one of the emergency descriptions. End user interfaces are displayed on second computing devices communicatively coupled with the database(s), having input fields configured to store user profiles in the database(s), each user profile including a geographic location. On a subset of the second computing devices associated with end users whose geographic locations fall within a geographic zone affected by an actual emergency, the end user interfaces display one of the emergency types matching the actual emergency and one of the emergency descriptions matching the actual emergency. Systems for implementing the methods are also disclosed herein.

3 Claims, 37 Drawing Sheets

(52) U.S. Cl.
CPC ............ *G08B 25/016* (2013.01); *H04L 67/26* (2013.01); *H04L 67/306* (2013.01); *H04W 4/02* (2013.01); *H04W 4/024* (2018.02); *H04W 4/90* (2018.02)

(58) Field of Classification Search
USPC .................................................... 340/539.13
See application file for complete search history.

(56) References Cited

U.S. PATENT DOCUMENTS

| | | | |
|---|---|---|---|
| 2002/0002513 A1* | 1/2002 | Chiasson | G06Q 30/06 705/26.8 |
| 2005/0249337 A1* | 11/2005 | Ordille | G09B 5/00 379/88.12 |
| 2007/0047520 A1* | 3/2007 | Byers | H04M 7/006 370/352 |
| 2007/0298758 A1* | 12/2007 | Verma | G08B 27/006 455/404.1 |
| 2014/0132393 A1* | 5/2014 | Evans | G08B 21/02 340/6.11 |
| 2014/0245158 A1* | 8/2014 | Greenberg | G06F 16/9537 715/733 |
| 2015/0199896 A1* | 7/2015 | Estes | G08B 25/016 340/541 |
| 2015/0271290 A1* | 9/2015 | Tao | H04L 41/5051 709/217 |
| 2016/0119424 A1* | 4/2016 | Kane | H04L 67/10 709/203 |
| 2018/0053401 A1* | 2/2018 | Martin | G08B 29/188 |

\* cited by examiner

FIG. 4

Ready2Go

News Feed

Irma Disaster

Description

Florida received a federal major disaster declaration for Individual Assistance for Charlotte, Collier, Hillsborough, Lee, Manatee, Miami-Dade, Monroe, Pinellas, and Sarasota counties. All 67 Florida counties were designated for the Public Assistance Program (Categories A-G), including district federal assistance.

admin | 20/12/2017 | Source

BACK

- publish
- Compose News
- Emergency Plan
- Recovery Map
- Push Notification
- Active Shooter
- Alert Selection

Ready2Go

- Publish
- Compose News
- Emergency Plan
- Recovery Map
- Push Notification
- Active Shooter
- Alert Selection ● All Users   ○ Geo Location User

EXPORT

| Name | Email ID | Phone Number |
|---|---|---|
| Vijay | vijay21@gmail.com | 9871141115 |
| Anandh | anandhi123@gmail.com | 9451121114 |
| Kumar | kumar54@gmail.com | 8874411124 |
| Andy A. | andy214@outlook.com | 8741152441 |
| John H. | john2145@live.com | 6744112874 |
| Harold | hal@gmail.com | 4152214778 |

EMERGENCY PREPARATION AND RESPONSE SYSTEMS AND RELATED METHODS

CROSS REFERENCE TO RELATED APPLICATIONS

This document claims the benefit of the filing date of U.S. Provisional Patent Application No. 62/619,571, entitled "Emergency Preparation and Response Systems and Related Methods," naming as first inventor Patrick F. Williams, which was filed on Jan. 19, 2018, the disclosure of which is hereby incorporated entirely herein by reference.

BACKGROUND

1. Technical Field

Aspects of this document relate generally to emergency preparation methods and emergency response methods, and related systems.

2. Background Art

Various types of emergencies occur throughout the world, such as hurricanes, earthquakes, fires, floods, active shooters, and so forth. General communication mechanisms exist for helping alleviate the effects of such emergencies, such as telecommunication networks, cell phones/towers, television, and the Internet. Some communication/information is given to persons, using traditional communication methods such as news reporting, in advance of an emergency to help with planning efforts such as evacuation instructions.

SUMMARY

Embodiments of emergency preparation and response methods may include: providing one or more databases communicatively coupled with one or more first computing devices; displaying, on the one or more first computing devices, one or more admin user interfaces having input fields configured to store one or more emergency types in the one or more databases, store one or more emergency descriptions in the one or more databases, and associate each emergency type with one of the emergency descriptions through the one or more databases; displaying, on one or more second computing devices communicatively coupled with the one or more databases, one or more end user interfaces having input fields configured to store one or more user profiles in the one or more databases, each user profile including a geographic location; and displaying, on the one or more end user interfaces of a subset of the second computing devices associated with end users whose geographic locations fall within a geographic zone affected by an actual emergency, one of the emergency types matching the actual emergency and one of the emergency descriptions matching the actual emergency.

Embodiments of emergency preparation and response methods may include one or more or all of the following:

The geographic location may be a permanent location selected by an end user.

The geographic location may be a current GPS location of an end user.

The one or more databases may further include one or more checklists associated through the one or more databases with the one or more emergency types.

Displaying, on the one or more end user interfaces of the subset of the second computing devices, one of the checklists associated through the one or more databases with the emergency type matching the actual emergency.

Displaying, on the one or more end user interfaces of the subset of the second computing devices, an evacuation route for leaving the geographic zone affected by the actual emergency.

Displaying, on the one or more end user interfaces, an input field that when selected by a first end user initiates the sending of a notification to a second end user indicating whether the first end user is safe.

Displaying, on the one or more end user interfaces, an input field that when selected by an end user initiates the sending of a notification to an administrator indicating whether the end user has heard gunshots.

Embodiments of emergency preparation and response systems may include: one or more databases communicatively coupled with one or more first computing devices; one or more user interfaces, displayed on the one or more first computing devices, having input fields configured to, in response to receiving one or more user inputs, store one or more emergency types in the one or more databases, store one or more emergency descriptions in the one or more databases, and associate each emergency type with one of the emergency descriptions through the one or more databases; one or more second computing devices communicatively coupled with the one or more databases; one or more user interfaces, displayed on the one or more second computing devices, having input fields configured to, in response to receiving one or more user inputs, store one or more user profiles in the one or more databases, each user profile including a geographic location; and one or more user interfaces, displayed on a subset of the one or more second computing devices associated with end users whose geographic locations fall within a geographic zone affected by an actual emergency, displaying one of the emergency types matching the actual emergency and one of the emergency descriptions matching the actual emergency.

Embodiments of emergency preparation and response systems may include one or more or all of the following:

The geographic location may be a permanent location selected by an end user.

The geographic location may be a current GPS location of an end user.

The one or more databases may further include one or more emergency preparation checklists, each emergency preparation checklist associated through the one or more databases with one of the emergency types.

The system may further include one or more user interfaces displaying, on the subset of the one or more second computing devices, one of the emergency preparation checklists associated through the one or more databases with the emergency type matching the actual emergency.

The system may further include one or more user interfaces displaying, on the subset of the one or more second computing devices, an evacuation route for leaving the geographic zone affected by the actual emergency.

The system may include a user interface displaying, on one of the second computing devices, an input field configured to, in response to receiving an input from a first end user, initiate a notification to a second end user indicating whether the first end user is safe.

The system may further include a user interface displaying, on one of the second computing devices, an input field configured to, in response to receiving an input from an end user, initiate a notification to an administrator indicating whether the end user is in an active shooter situation.

Embodiments of emergency preparation and response methods may include: providing one or more databases communicatively coupled with one or more first computing devices; displaying, on the one or more first computing devices, one or more admin user interfaces; in response to receiving user input using the one or more admin user interfaces, storing a plurality of emergency types in the one or more databases, storing a plurality of emergency descriptions in the one or more databases, and associating each emergency type with one of the emergency descriptions through the one or more databases; displaying, on a plurality of second computing devices communicatively coupled with the one or more databases through a telecommunications network, one or more end user interfaces; in response to receiving user input using the one or more end user interfaces, storing a plurality of user profiles in the one or more databases; in response to receiving user input using the one or more end user interfaces or receiving GPS locations of the plurality of second computing devices, storing a plurality of geographic locations in the one or more databases, and associating each user profile with one of the geographic locations; receiving, at one or more servers coupled with the one or more databases, a geographic zone of an actual emergency; determining, using the one or more servers, a subset of end users whose geographic locations overlap with the geographic zone of the actual emergency; and displaying, on the second computing devices of the subset of end users, one of the emergency types matching the actual emergency and one of the emergency descriptions associated through the one or more databases with the emergency type.

Embodiments of emergency preparation and response methods may include one or more or all of the following:

In response to receiving user input using the one or more admin user interfaces, storing a plurality of emergency preparation checklists in the one or more databases and associating each emergency preparation checklist with one of the emergency types.

Displaying, on the second computing devices of the subset of end users, one of the emergency preparation checklists associated through the one or more databases with the emergency type matching the actual emergency.

Storing an evacuation route in the one or more databases in response to receiving user input using the one or more admin user interfaces.

Displaying the evacuation route on the second computing devices of the subset of end users.

The displayed emergency preparation checklists (displayed on end user devices) may include selectors to indicate completion of items and, in response to an end user selecting one of the selectors, a completed status may be stored in the one or more databases or locally on an end user device.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements:

FIG. 4 is an illustrative example of an administrator interface of the system of FIG. 1;

FIG. 5 is an illustrative example of an administrator interface of the system of FIG. 1;

FIG. 11 is an illustrative example of an administrator interface of the system of FIG. 1;

FIG. 12 is an illustrative example of an administrator interface of the system of FIG. 1;

FIG. 12A is an illustrative example of an administrator interface of the system of FIG. 1;

FIG. 13 is an illustrative example of an administrator interface of the system of FIG. 1;

DESCRIPTION

Implementations/embodiments disclosed herein (including those not expressly discussed in detail) are not limited to the particular components or procedures described herein. Additional or alternative components, assembly procedures, and/or methods of use consistent with the intended emergency preparation and response systems and related methods may be utilized in any implementation. This may include any materials, components, sub-components, methods, sub-methods, steps, and so forth.

Implementations of dynamic emergency preparation and response systems and related methods relate to systems and methods to assist users in communication, preparation, awareness, and response to emergency and disaster situations.

Figure 1:
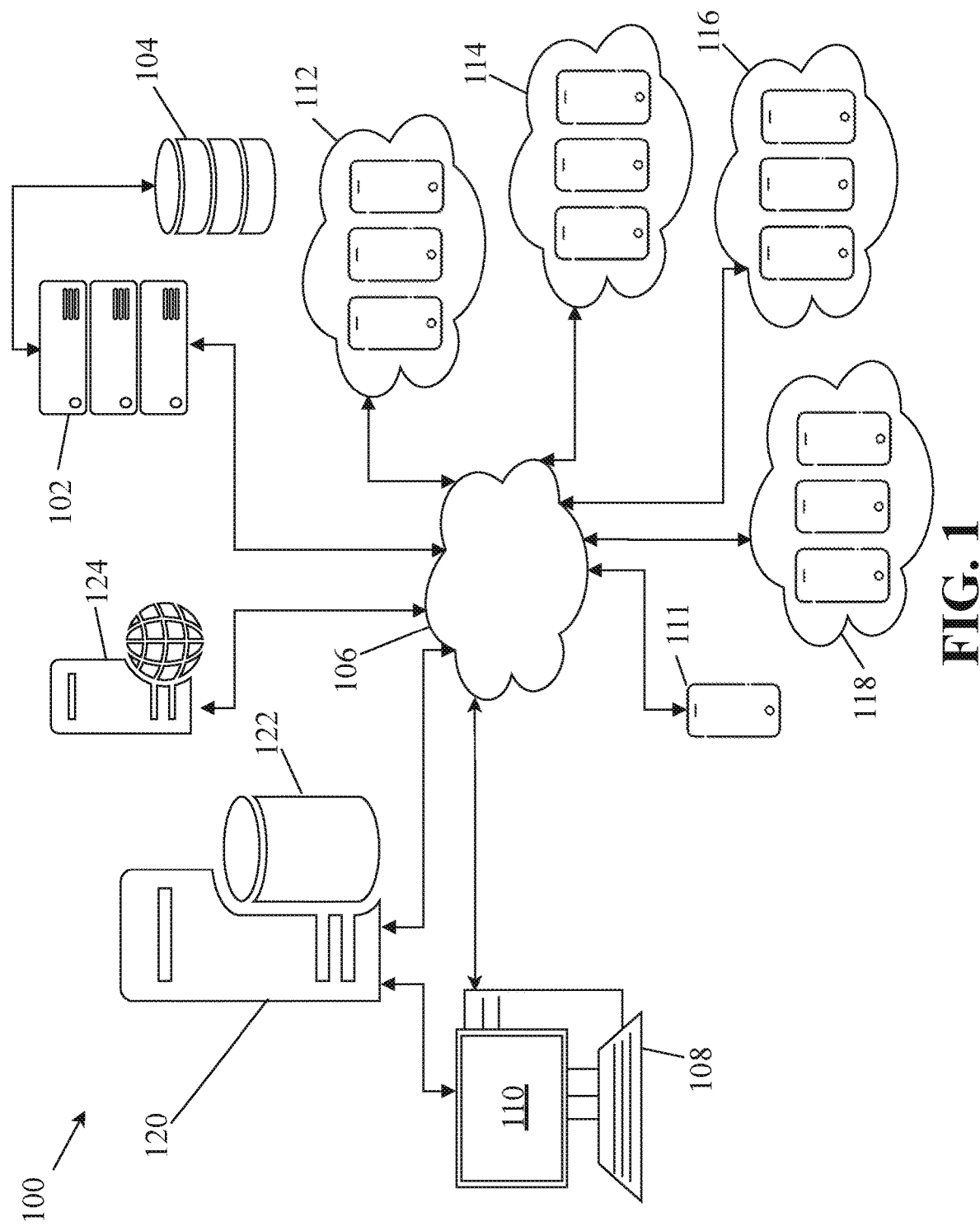
FIG. 1 is a diagram of an implementation of an emergency preparation and response system.

Referring now to FIG. 1., an implementation of an emergency preparation and response system (system) 100 is representatively illustrated. To the top right of the image one or more servers 102 are illustrated as being implemented using a web services provider (such as AMAZON WEB SERVICES (AWS)) and the server(s) is/are communicatively coupled with one or more databases 104. An administrator (admin) accesses the server(s) and/or database(s), from a computing device 108 having an interface on a display 110 (and/or from a mobile device 111), through a telecommunications network 106 such as the Internet. End user computing devices (second computing devices) 112, 114, 116, 118 also access the server and/or database through the telecommunications network (the end users represent people in different geographic areas such as some users in Chicago, some in Florida, some in Washington, some in Las Vegas, etc.—naturally the system may be used worldwide in any municipality, county, state, country, etc.).

The admin computing device (first computing device) 108 could in implementations be directly coupled with a server 120, for example one or more in-house servers could be used and an admin computing device could be hard wired to the server(s) and one or more database(s) 122 could be housed on the same server or elsewhere, as opposed to the above remote server/database example. In such an example the end user computing devices would still be communicatively coupled with the server, database, and/or admin computing device remotely through the telecommunications network. The servers in either example could be standalone devices or virtual servers implemented on the same device as other virtual servers, i.e., in a virtual environment where multiple virtual servers are implemented using the same underlying hardware and operating system.

The admin computing devices 108, 111 are representatively illustrated with both a desktop computer and a mobile device, as the administrator may access the admin portal using a desktop computer, a laptop, a tablet, a mobile phone, and so forth. In some implementations the admin portal is only accessed via a website (using any of said devices) and in other implementations an admin-side software application (app) could be provided and installed on a mobile device by the admin to allow the admin to access the admin portal without having to use a browser. In implementations in which a website is used to access the database, the servers may include one or more web servers 124 communicatively coupled with the database (either directly, or indirectly through the telecommunication network or a local area network, or through another server, and so forth). As can be seen, whatever device is used by the admin, the device will have a display, and on the display one or more user interfaces will be displayed for the admin to interact with the system through the admin computing device (such as the interfaces displayed in FIGS. 2-13C, described hereafter).

The system includes the database and the admin uses the one or more interfaces displayed on the admin computing device(s) to store data in the database through the server(s). The admin stores information related to news feeds, geo location alerts, emergency plans, and so forth in the database. The server(s) are seen communicatively coupled with the end user computing devices from different geographic locations and may be used to receive information from, and send information to, the end user computing devices.

By non-limiting example, end users in one location may each receive a "News Feed" push notification to their mobile devices, end users in another location may each receive a geo alert push notification to their mobile devices, end users in another location may each receive an emergency plan checklist push notification to their mobile devices, and end users in another location may each send an "Active Shooter" notification to the servers (which may then be used, for example, to notify police and/or emergency personnel and/or to notify other users in the affected area, such as within a global positioning system (GPS) determined radius). Other notifications/communications may be sent to or from the users, and other notifications/communications may be sent to/from the admin(s). When a user sends data through the telecommunication network to the servers this data may be written to the database and retrieved for communication to other users, to the admin, to police or emergency personnel, and so forth.

Naturally, FIG. 1 is a simplification, and the system may include any number of admin computing devices, local servers, local databases, website servers, cloud servers, cloud databases, end user devices, and so forth.

The admin may utilize an admin portal to send one or more messages or push notifications to selected users (such as all users in a certain geographic area) without storing anything in the database (but utilizing the server(s)) and in implementations one or more users may send messages or notifications to the admin computing device through the telecommunications network using the server(s) without storing anything in the database.

Figure 2:
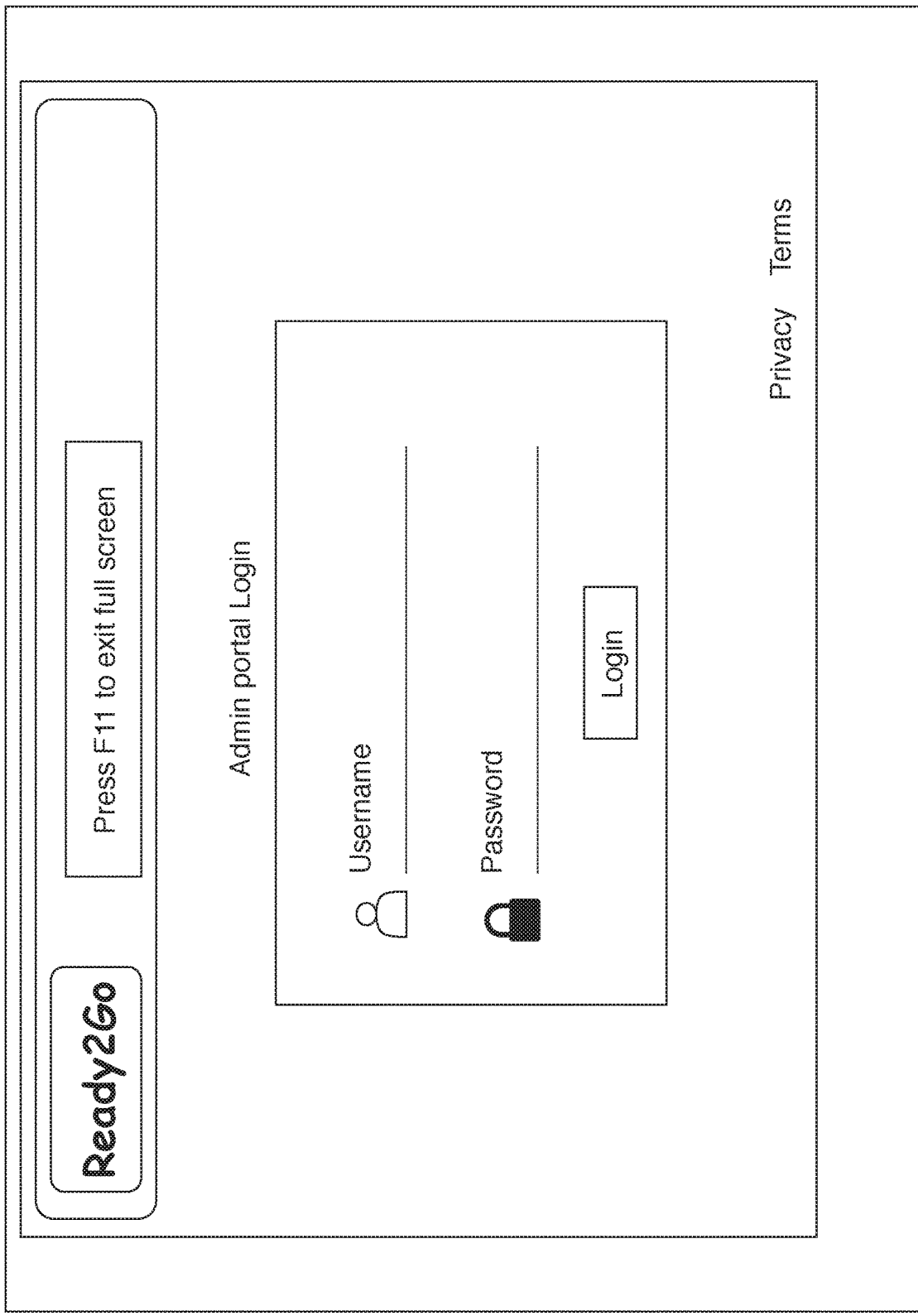
FIG. 2 is an illustrative example of an administrator interface of the system of FIG. 1.

Referring now to FIG. 2, an implementation of an admin login user interface (interface) 200 is shown, with a logo in the upper left corner, and in the top center is a notice to press a keyboard shortcut to exit full screen mode. The user may enter a username and password (shown in FIG. 3) and select the Login button to log in, which in implementations will bring the admin to an interface like interface 400 shown in FIG. 4. It is to be presumed that this admin already created an admin user account utilizing another user interface not shown, which would include adding profile information, contact information, and so forth. Privacy information and Terms may be accessed by selecting links having those names.

The admin may be any person or representative of any organization. For example, the system may be used by a government organization, a business, a nonprofit organization, and so forth. By non-limiting example, the system may be utilized by one municipality in a geographic area which often experiences hurricanes, by another municipality which is at risk for shootings, by a state which experiences many floods, and so forth. Each municipality/state/organization may have an account to use the system, with separate admin profile and login credentials and the like stored in the database, for those admins to be able to set up the ability to notify persons within their geographic area for emergency preparedness and response. Businesses and nonprofits could utilize the system in a comparable manner to be able to send notifications to persons within specified geographic areas. In either case the end users would download and install the end user mobile application at the urging of their municipality, or state, or business, or nonprofit management/leadership, which may be provided at no cost to the end users and/or may include some one-time and/or subscription cost and/or may include one or more advertising functions to fund a business which manages the system. In some implementations there will only be one admin (such as a business or organization) that will sell the services to third parties, such as to municipalities and the like, and the admin will retain control over the admin portal, customizing messages/alerts targeting the needs of the third party. In that implementation only the admin organization and its employees will have access to the admin portal.

In another implementation of the system, there could be only one central administrator (or group of administrators) to manage the administrator end (such as the business managing the system, described above) and the end users may all download the mobile software application either at no cost to the end user, or including any of the costs or advertisement mechanisms described. In the implementations given as examples the app will be offered free initially with the end goal of having each user subscribe to the app once the app has gotten some traction.

Figure 4:
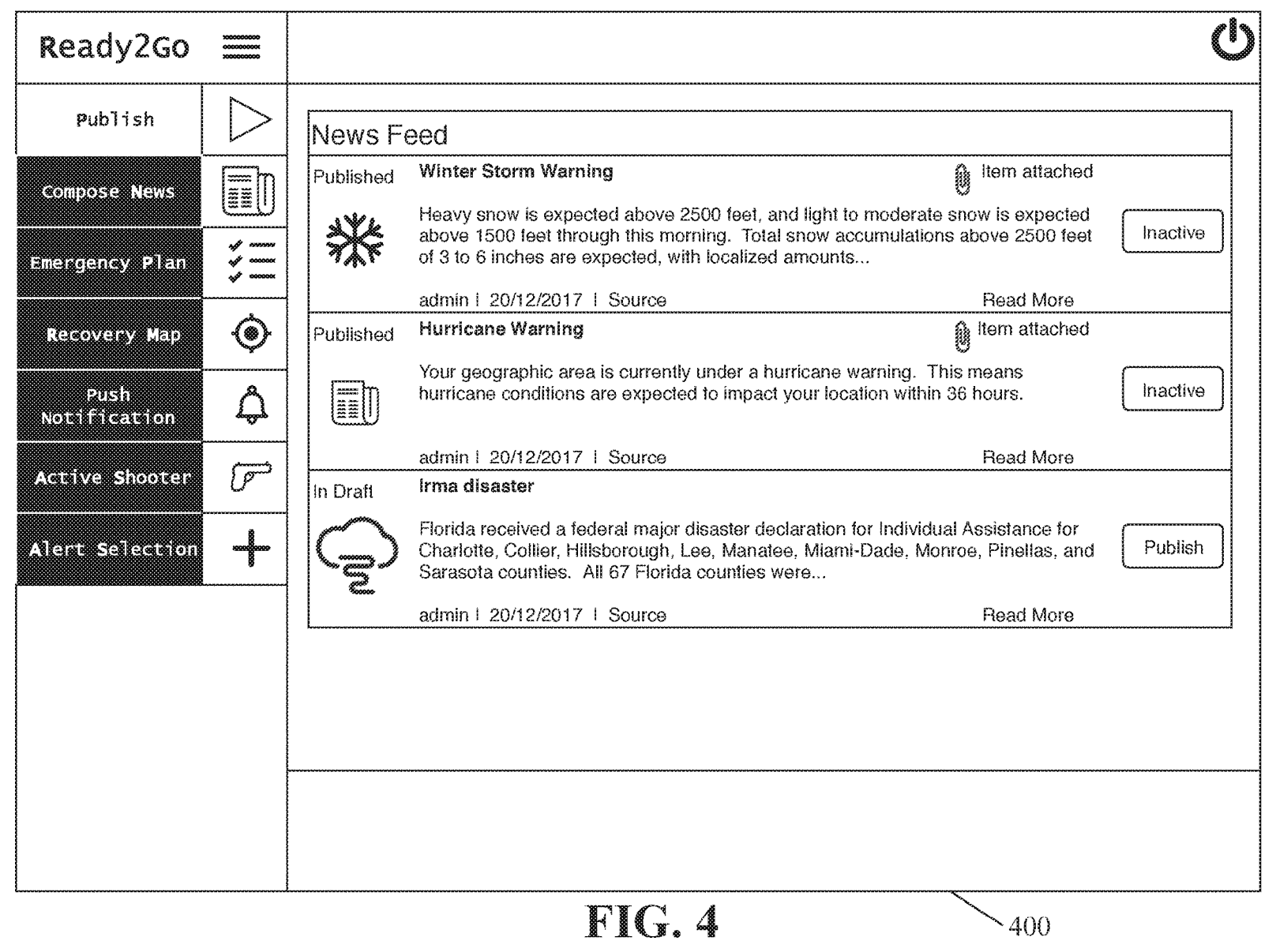

FIG. 4 shows an interface 400 which is available after login, which includes a menu on the left-hand side allowing navigation between a Publish interface, a Compose News interface, an Emergency Plan interface, a Recovery Map interface, a Push Notification interface, an Active Shooter interface, and an Alert Section interface. At the top next to the Ready2Go mark is shown three horizontal bars indicating access to another menu which may be used to access other interfaces such as, by non-limiting example, a profile interface to edit the admin contact information, login information, payment information, and so forth. At the top right is a power button logo which may be used for exiting the app (though in other implementations this could be an activate/deactivate toggle to toggle the system (or some subset of the system) on/off).

In FIG. 4 the Publish menu item is selected and the Publish interface is accordingly displayed on the computing device of the admin. The Publish interface allows the admin to publish previously drafted News Feed items and further allows the admin to see previously published News Feed items. Shown are previously published items related to a hurricane warning and a winter storm warning, showing an Inactive logo to the right. At the top of the list is an Irma Disaster news feed item which is "in draft" and which may be published by selecting the "Publish" button to the right. The admin may also select the "Source" link to see a link to the source material or may select the "Read More" wording to expand the text. Upon selecting the "Read More" wording the user interface 500 shown in FIG. 5 is shown which expands the text to see the entire draft news feed item. The draft news feed item is seen to have a title (or in implementations an emergency type), an image, a description (or in implementations an emergency description), and a source link that have been provided by the admin. The source link may be, for example, a link to a full news story accessible on a website (such as a third-party news website). The admin may press the "Back" button to return to the interface shown on FIG. 4. When the Publish button is selected, in implementations the news feed story will appear in the news feeds of end users for whom the story is relevant as either determined by the system (such as by using GPS coordinates or listed addresses/locations of end users input into the system) and/or as determined by the admin (such as all end users within a certain city, a certain GPS radius, certain zip codes, etc.). In other implementations, however, selecting Publish simply stores the updated information in the database and allows the admin to now select the published news feed item for a push notification, as described hereafter.

Figure 6:
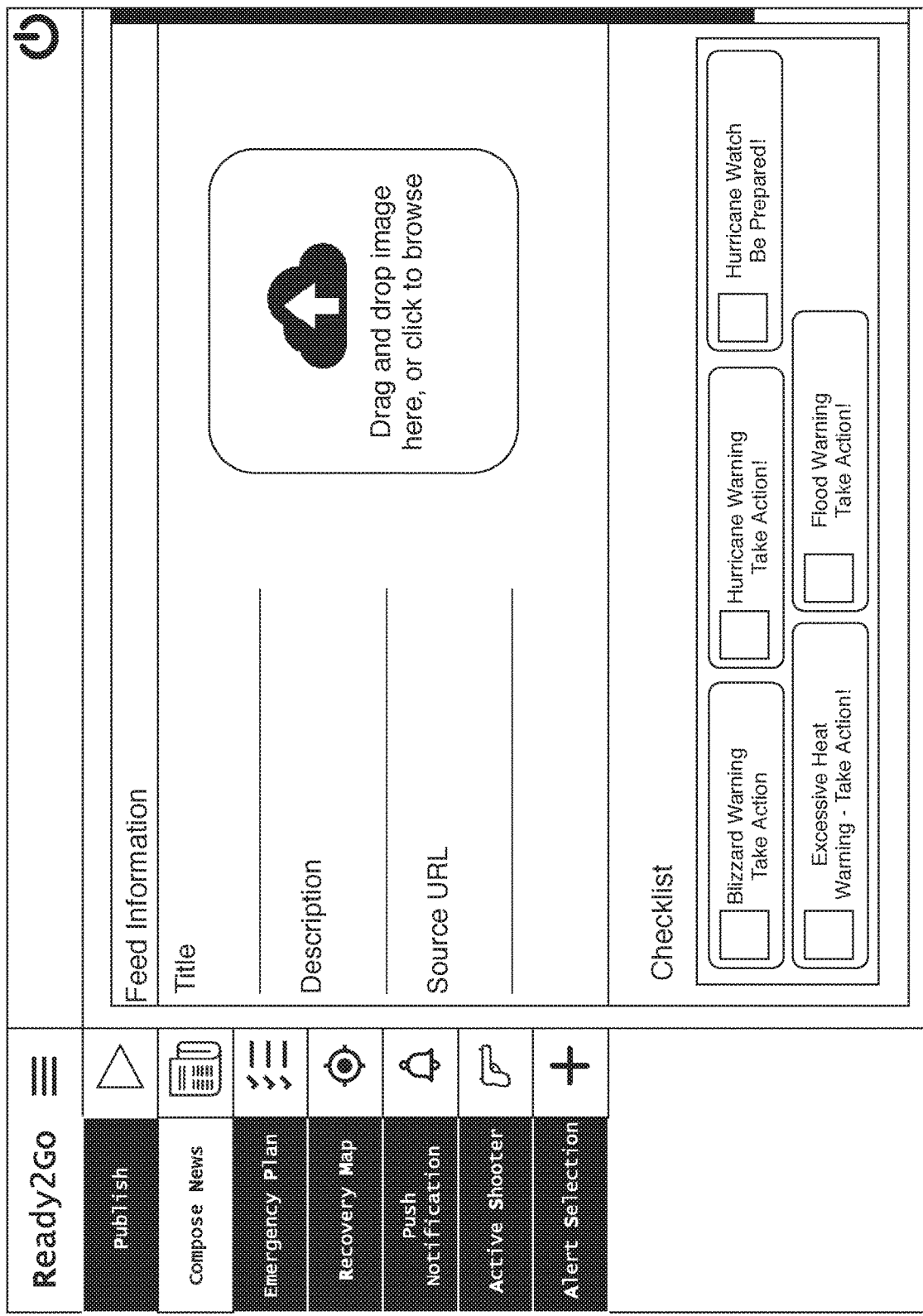
FIG. 6 is an illustrative example of an administrator interface of the system of FIG. 1.
Figure 7:
FIG. 7 is an illustrative example of an administrator interface of the system of FIG. 1.

The draft news feed item shown in FIGS. 4-5 was drafted through the Compose News interface (interface) 600, which is shown in FIG. 6 and is accessed by the admin selecting the left "Compose News" menu item. Here the admin can input a title, a description, a source uniform resource locator (URL), a photo, and select one or more previously created emergency plan checklists to associate with the news feed through the database. In implementations all data input into any admin user interface is stored in the previously described database(s) through the previously described server(s). In FIG. 7 it is seen that the admin has selected a title and a description, has uploaded or selected a database-stored image to associate with the news feed item, and has selected the "Hurricane Warning" emergency plan checklist to associate with the news feed item. The admin may select the Save In Draft button to save the draft news feed item. The admin may return to this interface at any time to edit the news feed item and/or may delete the item using one or more of the above-mentioned interfaces.

Figure 7B:
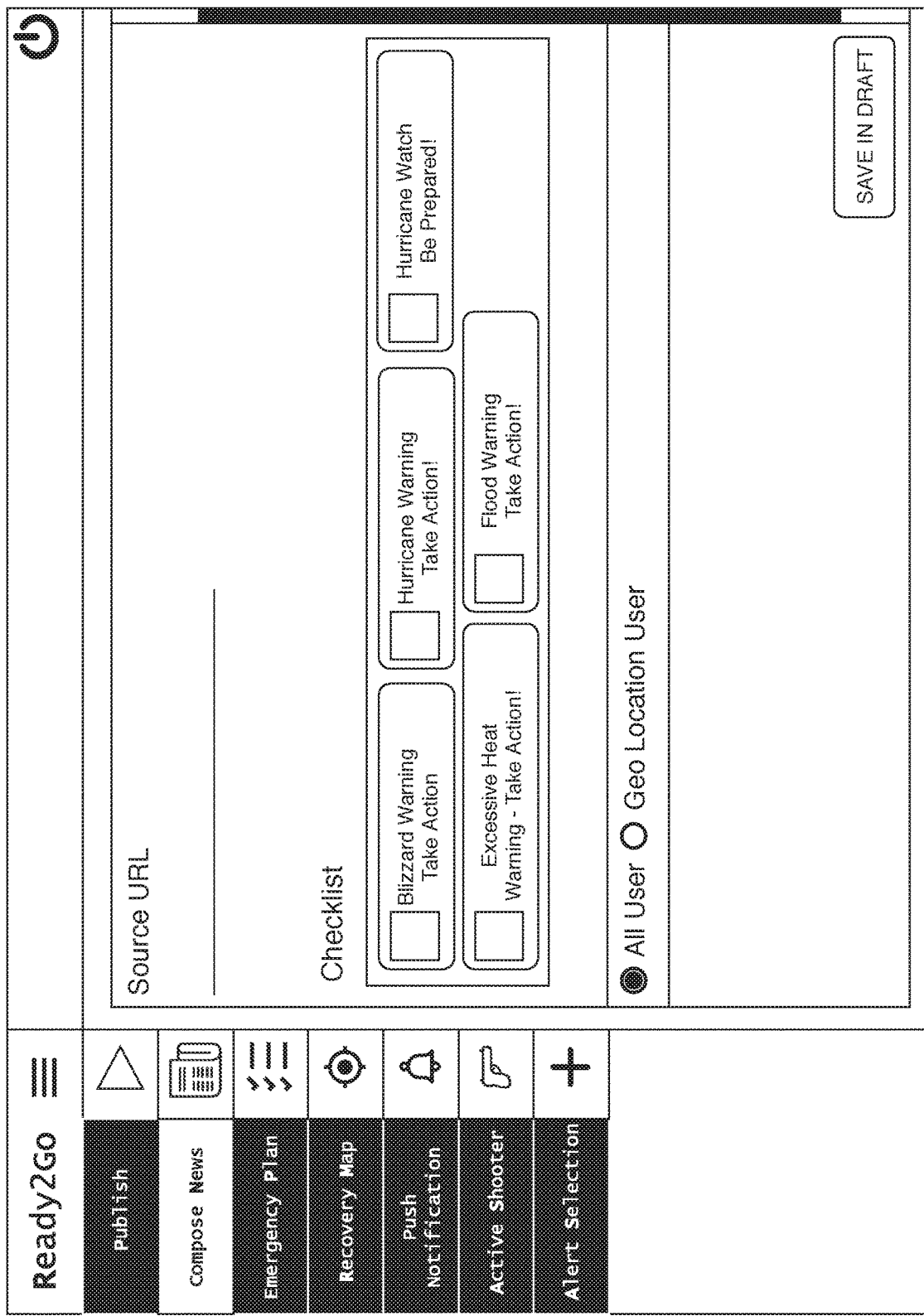
FIG. 7B is an illustrative example of an administrator interface of the system of FIG. 1.

FIG. 7B shows that, in some implementations, this interface 600 includes a selection between "all users" or "geo location users." If "all users" is selected then the saved draft would be prepared to be sent out to all users within the database, whereas if the "geo location user" is selected then the saved draft would be prepared to be sent out to some subset of users based on geographic criteria (which may be entered using another interface or in some implementations using input fields on this interface) such as all users within a certain distance from a GPS location, all users within a certain city or county or state (or multiple cities, counties, states), etc. In other implementations "all users" could have another meaning, for example "all users" could be selected so that, when a notification is received by the system from some third-party provider (such as by example a flood notification), if the "all users" option has been selected then a corresponding push notification will be sent by the system to all the users that are within the area that was included in the warning from the third-party provider (whereas if the geo location user option had been selected the notification would go to all users who are within some predefined geographic zone that corresponds with the area of the third-party warning but may be larger or smaller or in some way different from the original geographic zone of the third-party provider).

Figure 7C:
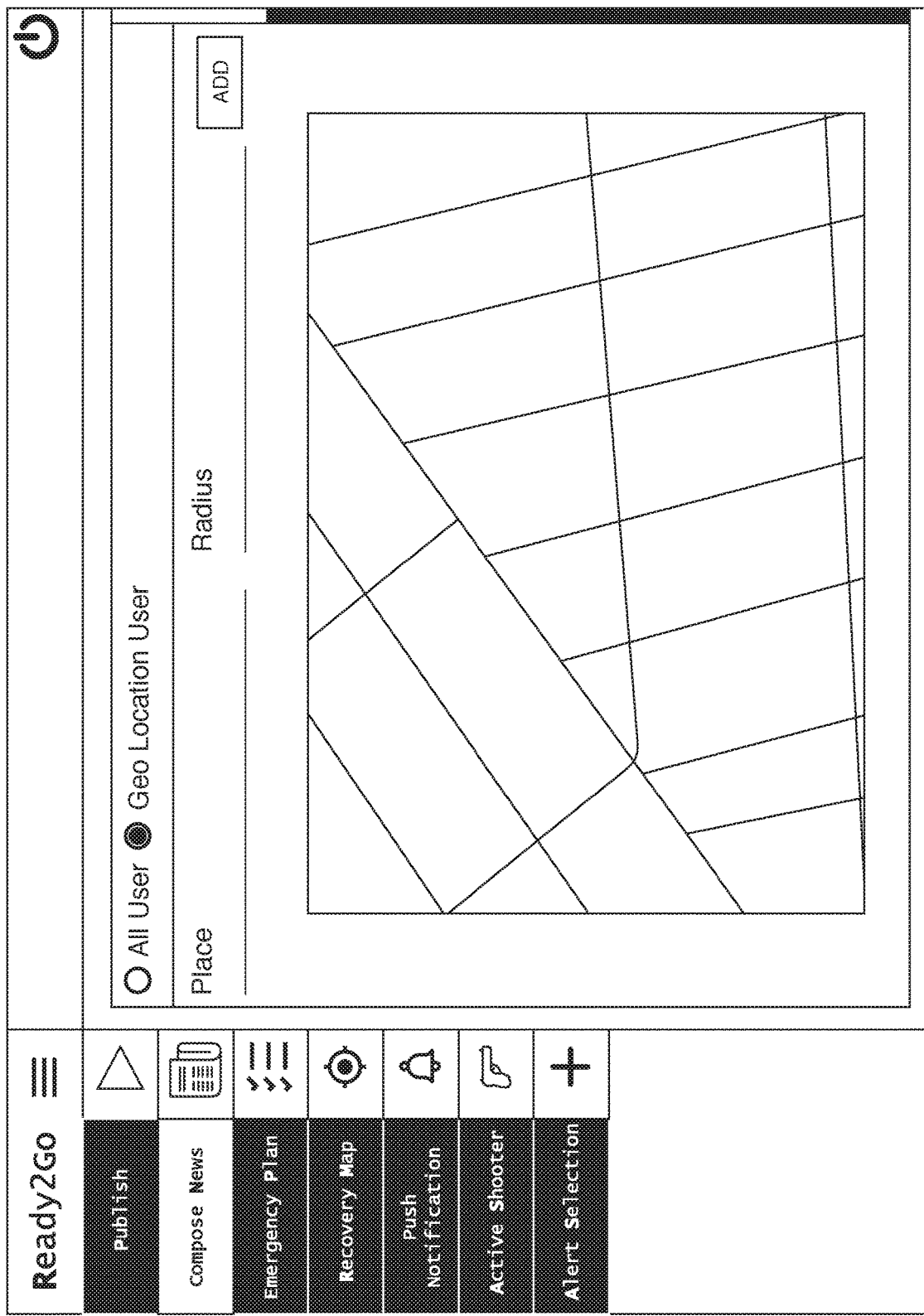
FIG. 7C is an illustrative example of an administrator interface of the system of FIG. 1.
Figure 7D:
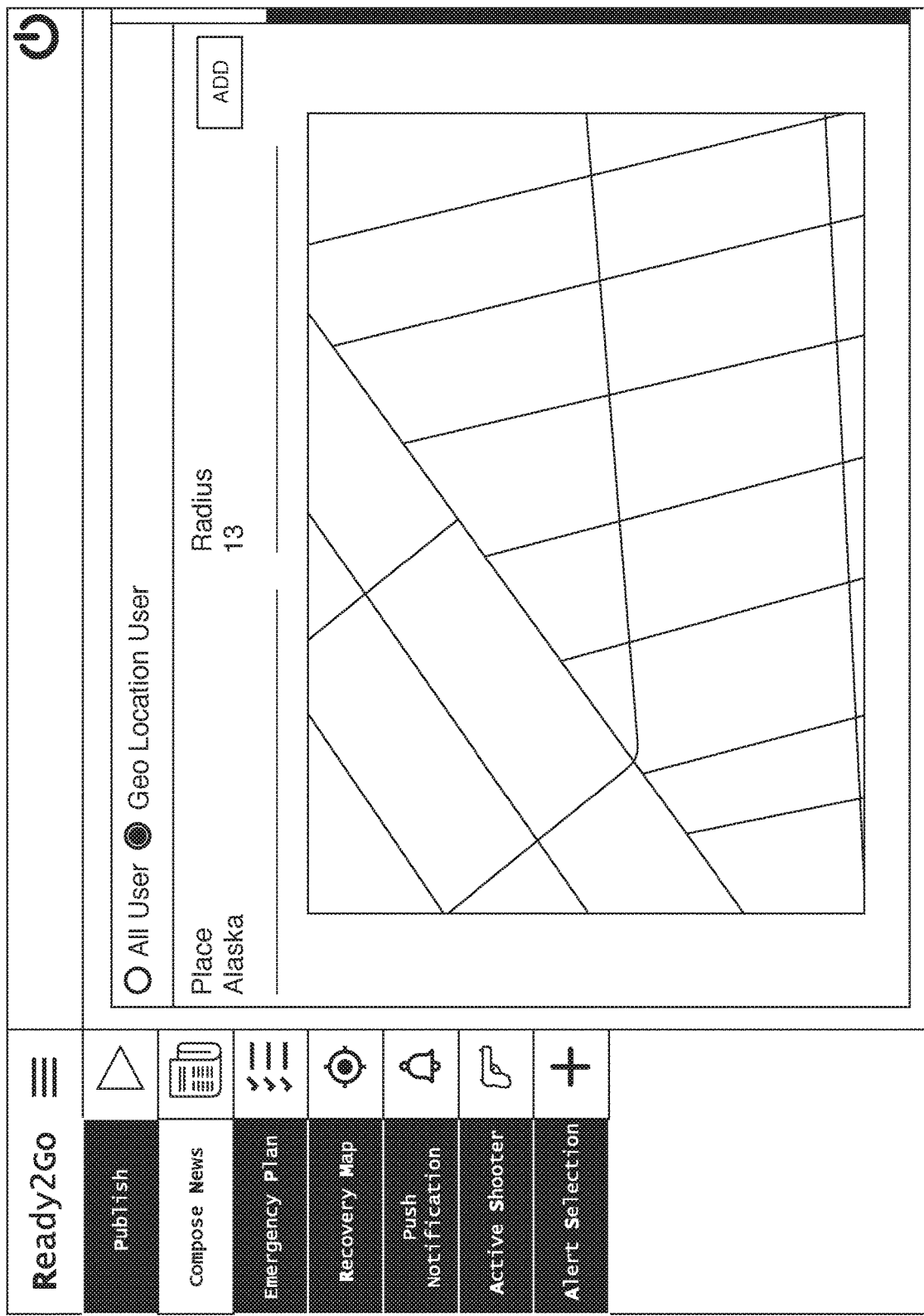
FIG. 7D is an illustrative example of an administrator interface of the system of FIG. 1.

For example, FIG. 7C shows an implementation in which, if the administrator selects "geo location user" on the interface in FIG. 7B, input fields for a place and a radius then appear along with a movable and zoomable map (which in the implementation shown is a third-party map accessed through the interface, in the shown implementation it is a GOOGLE MAPS map). The administrator may input the place (as shown in FIG. 7D), or select a place using a click on the map, select a radius, and select "add" to define this geolocation for this draft news feed item.

Figure 7E:
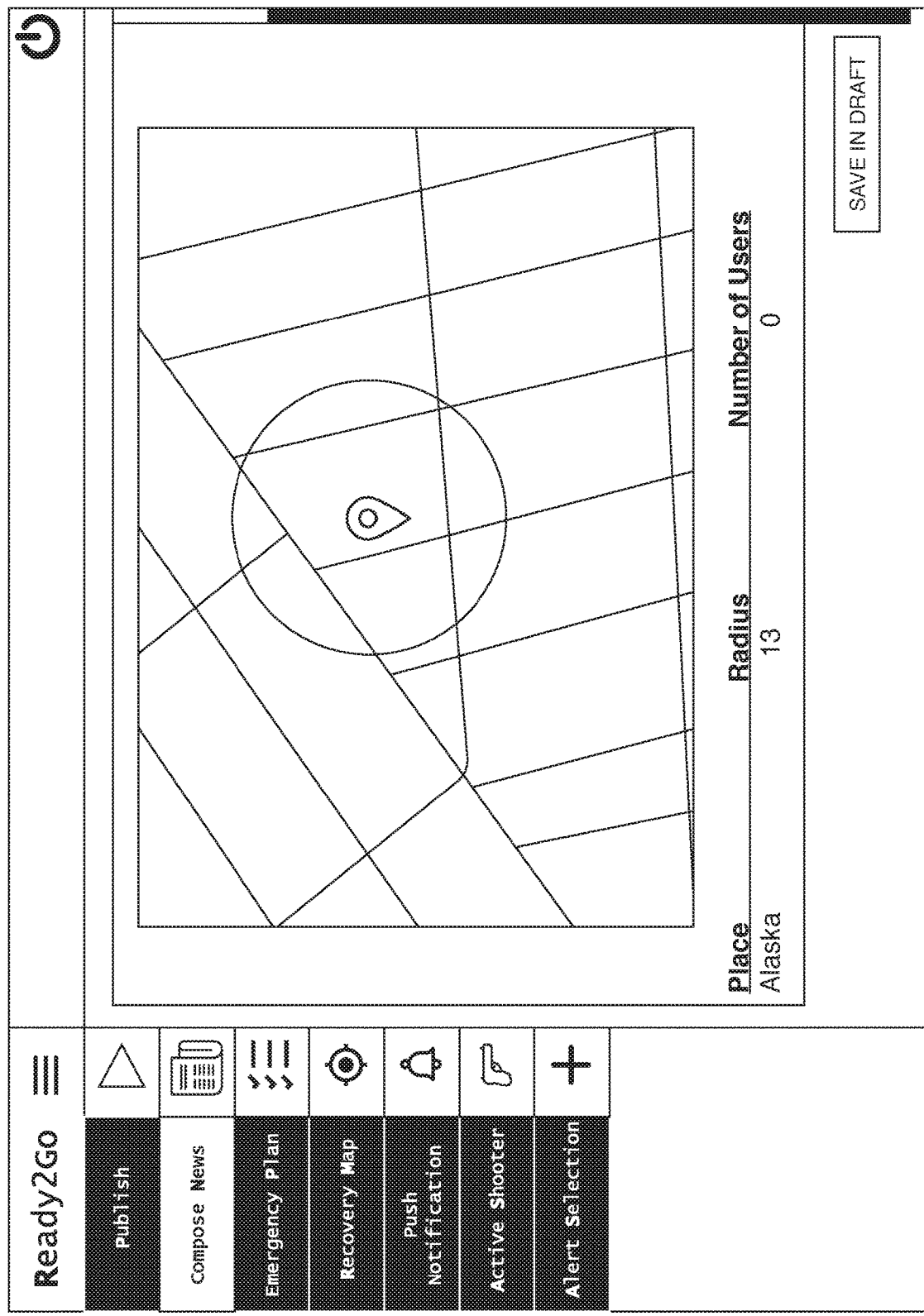
FIG. 7E is an illustrative example of an administrator interface of the system of FIG. 1.
Figure 8:
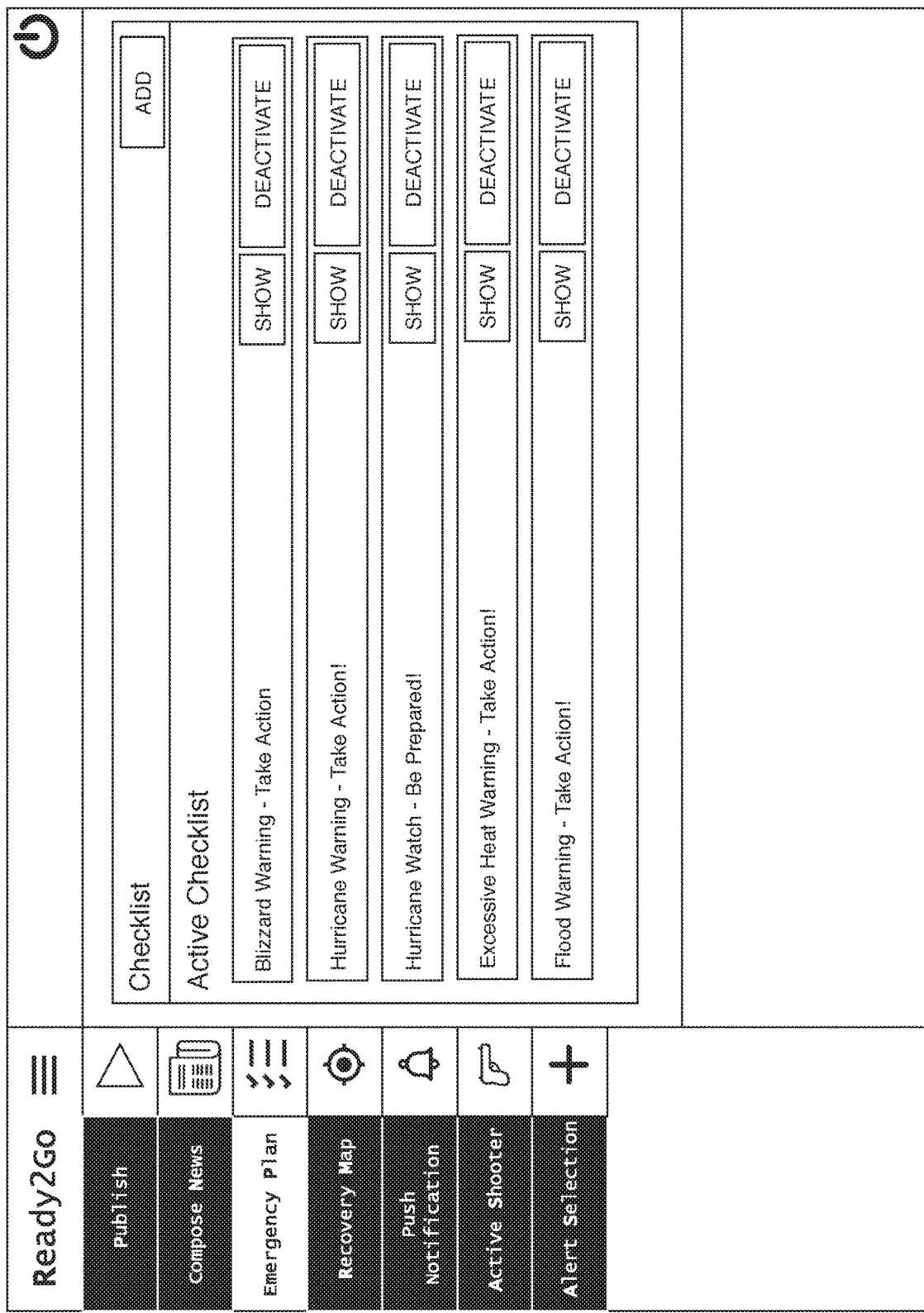
FIG. 8 is an illustrative example of an administrator interface of the system of FIG. 1.

After the administrator has selected the location and radius and selected add, the map, place, radius, and number of end users within that radius may appear at the bottom of the draft news feed item. The administrator may then see how many people this news feed item will be sent to when published or when sent as a push notification. The administrator upon viewing the interface of FIG. 7E, for example, would notice that there are zero users within the selected radius, which may result in the administrator redefining the selected geographic area or realizing that some mistake has been made in defining the geographic area. The administrator may return to the former interface and correct or edit the selected geographic area. In some implementations the interface of FIG. 7D could show the number of users in "real time" before an administrator adds the geographic selection so that the administrator can see the number of people who would receive this news feed item prior to adding the geographic selection. From the interface of FIG. 7E the administrator may select the "save in draft" button when desired to save the draft news feed item.

Figure 9:
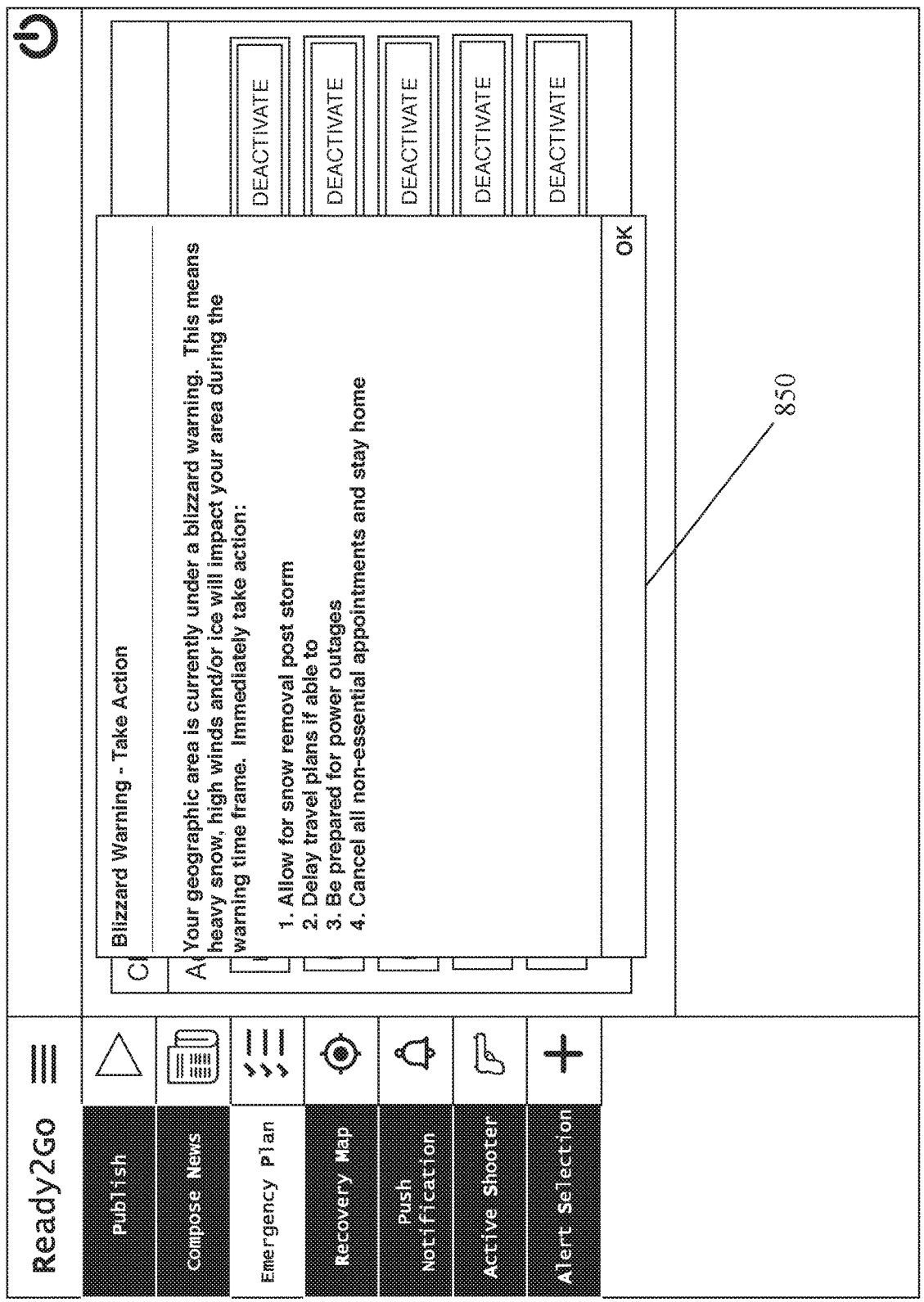
FIG. 9 is an illustrative example of an administrator interface of the system of FIG. 1.

Turning now to the emergency plan checklists, by selecting one or more checklists to associate with a news feed item, when the news feed item is published the end users receive not only the news feed story/warning, but also a checklist which they can use to prepare for the emergency. The admin can create custom checklists using an Emergency Plan interface (interface) 800, shown in FIG. 8 and accessed by selecting the Emergency Plan menu item on the left (in some implementations the menu item could instead be labeled "Checklists"). From this interface it is seen that the user may Add a new checklist or may show or deactivate any previously generated checklists. Each checklist title is shown on this page. If the user selects the Show button for one of the checklists a popup interface such as interface 850 shown in FIG. 9 is shown, which shows the title of the checklist "Blizzard Warning—Take Action," along with a text description related to the blizzard warning and a list of checklist items that the admin has previously created. The admin may edit the title, the text description, and the checklist items here or using another user interface and may close this window by selecting OK.

Figure 10:
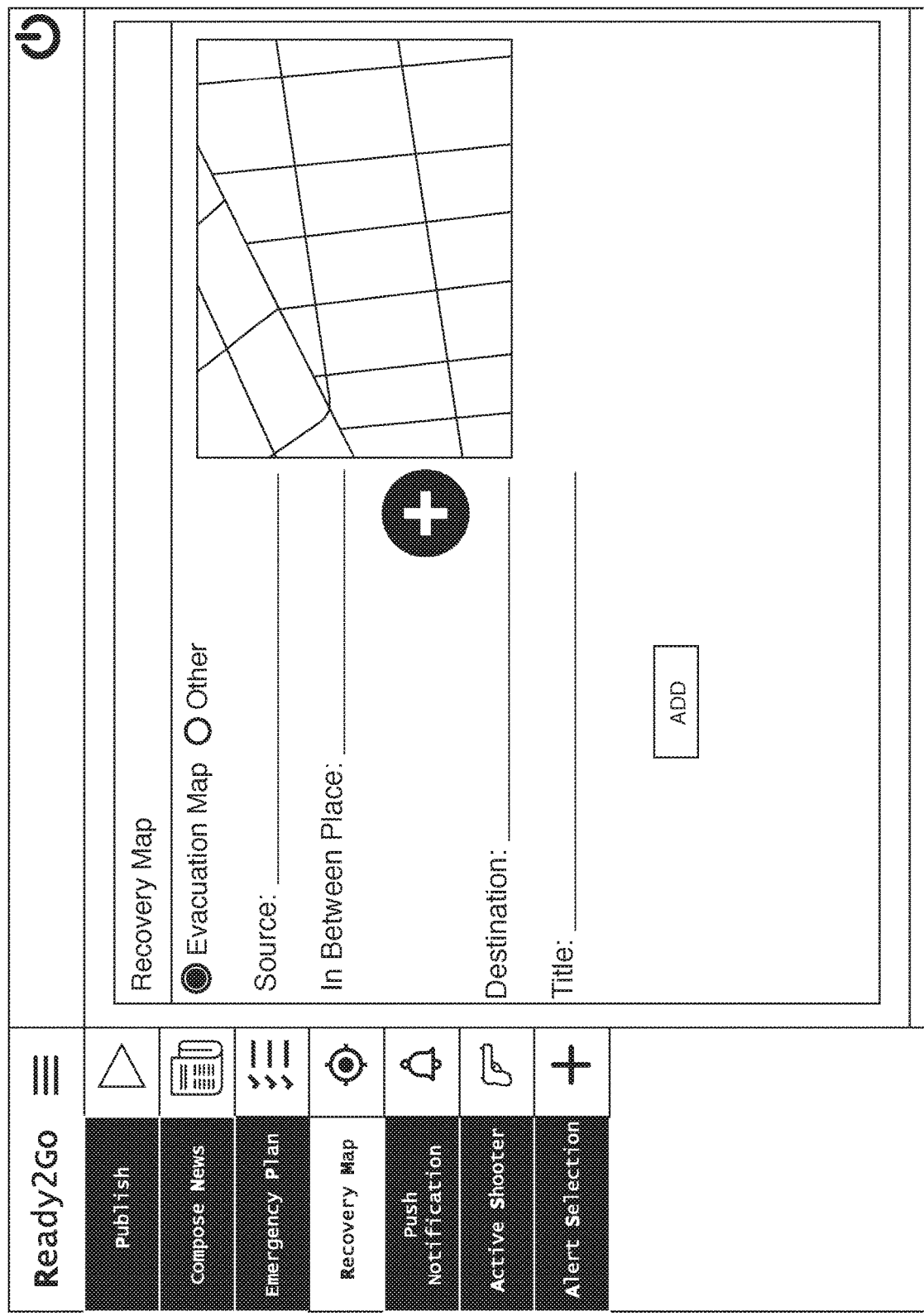
FIG. 10 is an illustrative example of an administrator interface of the system of FIG. 1.
Figure 10A:
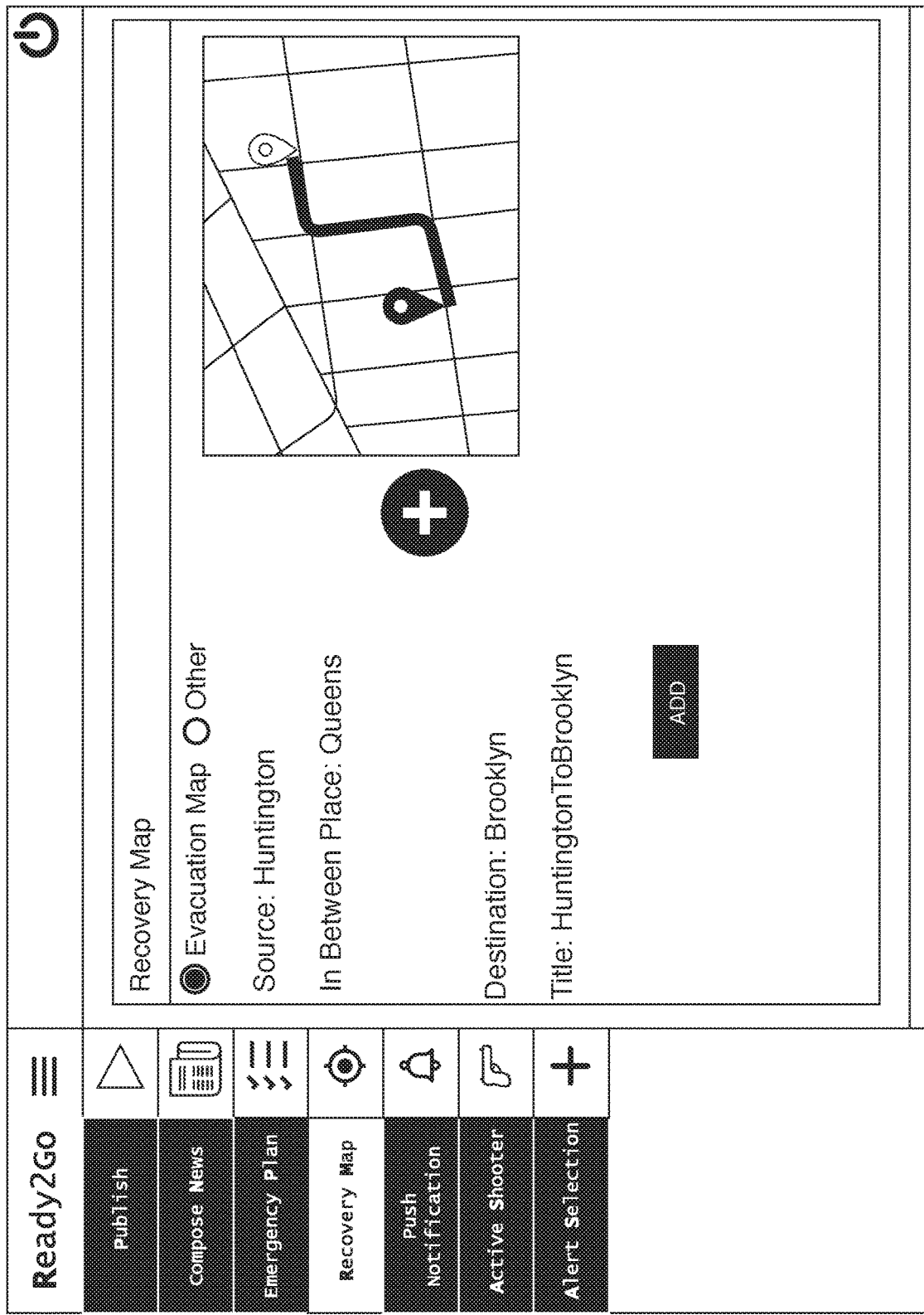
FIG. 10A is an illustrative example of an administrator interface of the system of FIG. 1.

FIG. 10 shows a recovery map interface (interface) 1000 accessed by the related menu item on the left. From this interface the admin may define evacuation maps or other items. As seen in FIG. 10 the admin may define a source location, may select an "in between place," a destination, and a title and the recovery map may include a displayed map which may come from a third-party provider and which may show the route between the source location and the destination. FIG. 10A shows that the admin has input each field and the route is shown from the source location, passing through the in between location, to the destination. The admin may add this recovery map using the Add button, and/or may add additional stops or in-between places using the plus icon. Once saved, a news feed item sent to users, such as a weather warning or the like, may include not only the checklist but also an evacuation map or the like which indicates to users a safe route for leaving a dangerous location.

The recovery map feature may also allow an admin to define important recovery information that users may need in an emergency such as, by non-limiting example, the location of services or goods (hotels, gas stations, groceries, pharmacies, etc.), evacuation information (such as some type of feed with latest information about evacuation orders or suggestions), and so forth.

Figure 11:
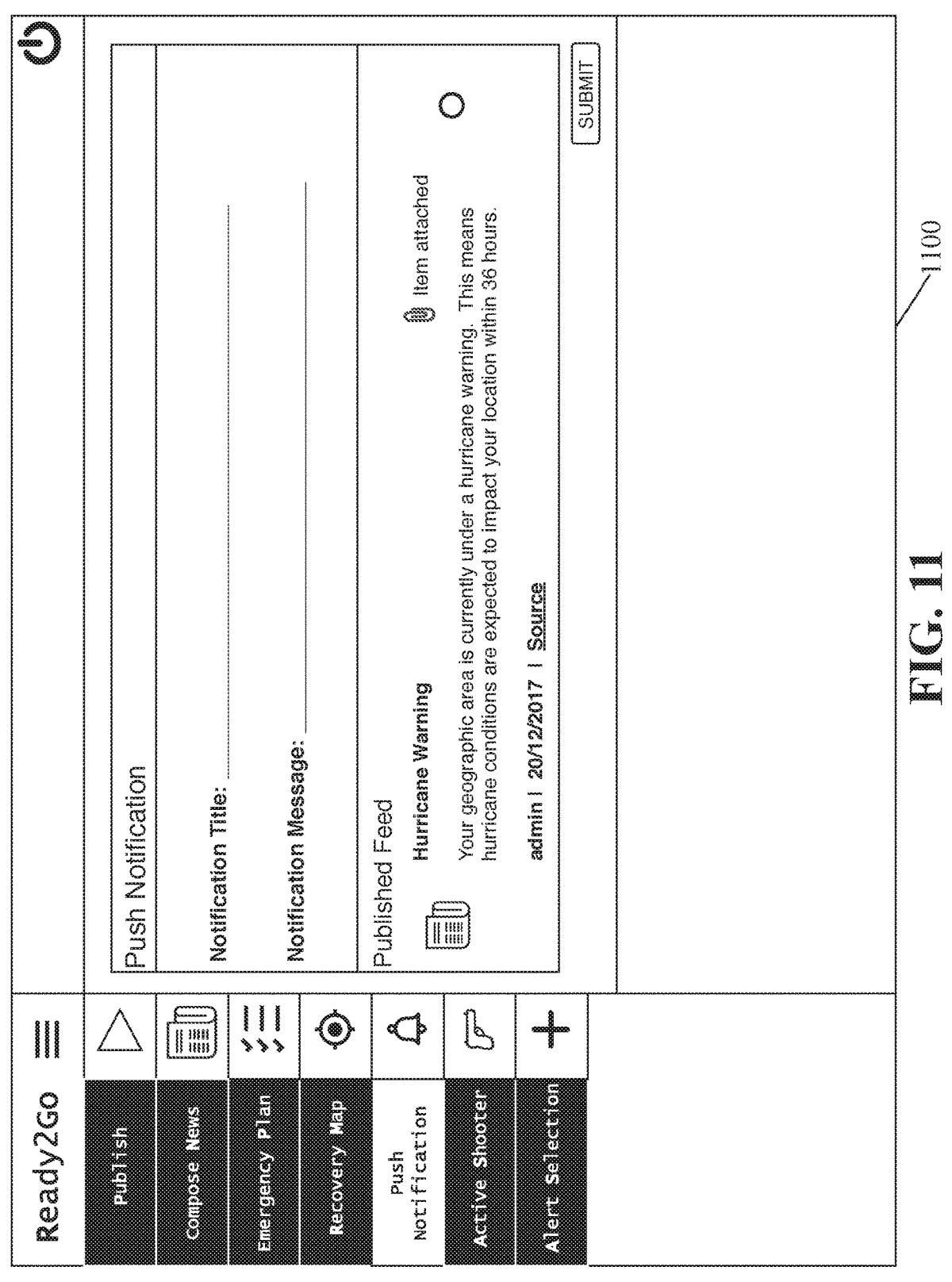

In implementations the admin may send a push notification to end users by navigating to a Push Notification interface (interface) 1100 as seen in FIG. 11, accessible by selecting the Push Notification menu item on the left. The admin may, using this and/or other Push Notification interfaces navigated to from the interface of FIG. 11, select a title for the push notification, draft a brief notification message, and select a previously published news feed item. Here the admin may select the "Hurricane Warning" news feed item that was previously published to the news feed. This news feed item already has an attached news source (URL) as indicated by the hyperlinked (underlined) "Source" wording and has a checklist attached, as indicated by the "Item Attached" wording.

In implementations the push notifications are automated. By non-limiting example, in implementations the admin does not have to manually publish alerts or manually send out a push notification, but rather the system includes functionality to, in response to receiving an alert from the NATIONAL WEATHER SERVICE (NWS) or some other third-party governmental or business organization, automatically send out a push notification to relevant users (the system server(s) effectively pushing the notification). For example, the figures previously described show the ability of a user to prepare draft news feed items and the like, but these may be general news feed items that can apply to many locations. So, for example, the admin may prepare one "hurricane warning" news feed item and save it in the system, and the admin may also set up trigger events within the system and using the servers and database(s), so that when the NATIONAL WEATHER SERVICE issues a hurricane warning for, by non-limiting example, Houston, the system automatically sends a push notification to all end users of the app who are in Houston, or who list Houston as their address on record, or who list Houston as an area they want to keep an eye on (for example if they have family/friends there), or all users within some pre-defined mileage of Houston, and so forth, including the predefined checklist for those users. The system may accordingly interface with third-party weather and/or disaster or emergency notification providers, including interfacing with their websites and/or software to provide the automated notifications to users.

To explain further, in implementations wherein a third-party notification provider such as the NATIONAL WEATHER SERVICE issues an alert, an automated process is initiated which includes sending out one of the pre-populated checklists to users affected by the warning. The checklist is correlated with the type of warning from the third-party notification provider (such as a tornado checklist corresponding with a tornado notification from NWS). This is useful especially for warnings that are time-critical, which is the case for instance with tornado warnings. If the warning is not issued quickly to users then the area may be affected before users receive the notification. Automating the sending of push notifications from the system to the users thus allows dynamic real-time warnings to be sent to users with enough time for them to react appropriately.

In some implementations the admin may predefine geolocations, so that for example when a weather warning is issued for a specific city (Chicago, for instance), the system will send the notification to all users within a predefined radius from that specific city—even if the admin-defined geographic area is larger than the specific city, county, or so forth, or smaller.

Figure 12:
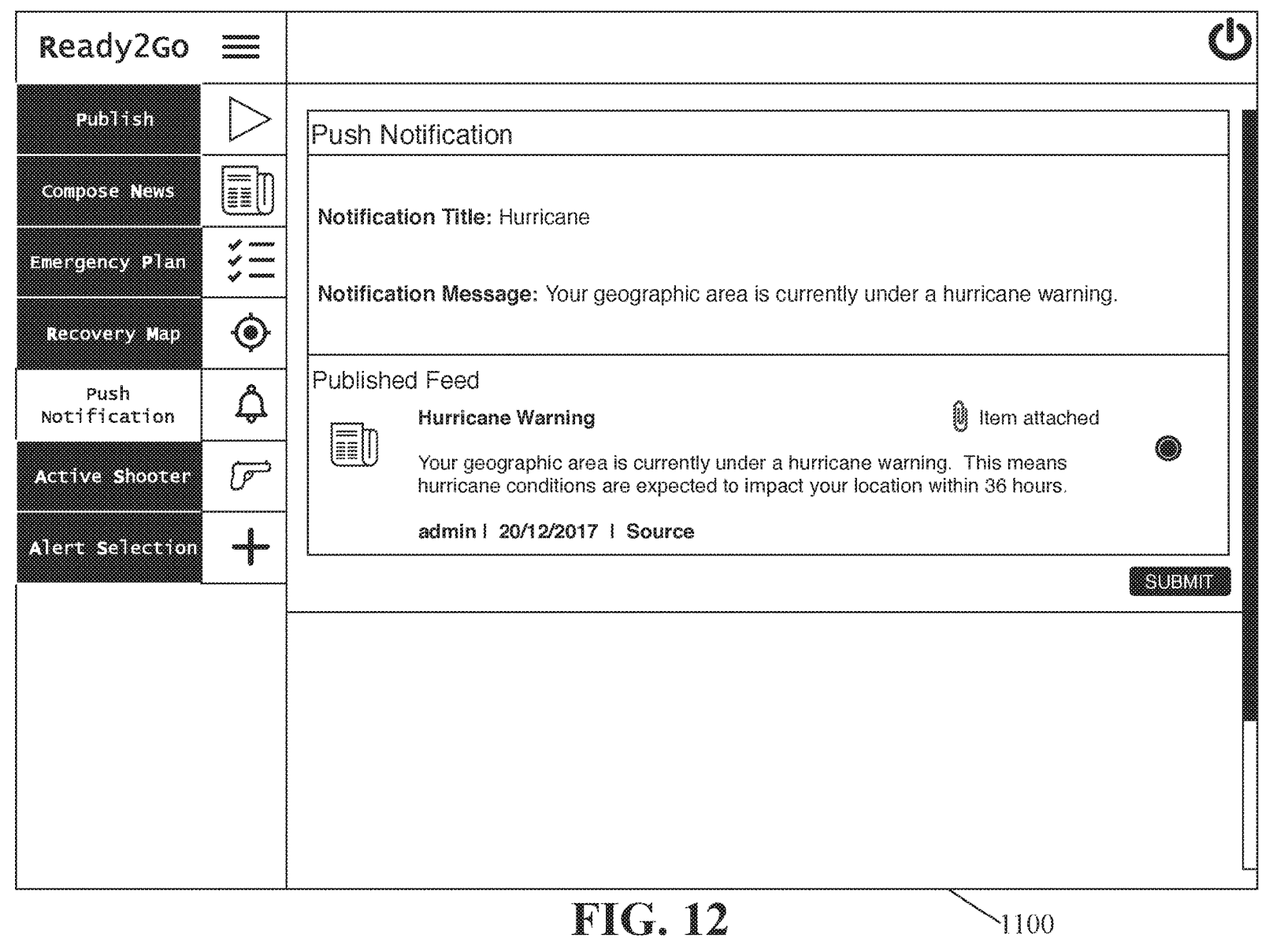

In FIG. 12 the admin has selected the "Hurricane Warning" news feed item by selecting the radio button and may then select "Submit" to send a push notification to end users. The push notification will, using an audio, visual, and/or haptic signal, alert the users to the news feed item. By non-limiting example, this could be done by the phone vibrating, by a beep or chime or other noise sounding, and/or by a visual alert such as a bell icon or a "New Message" notification at the top menu bar of a mobile phone (similar to a new call notification or a new text message notification). In implementations the system could also send a text and/or email notification to the end user, which preference may in implementations be set by the admin and/or the end users.

Figure 12A:
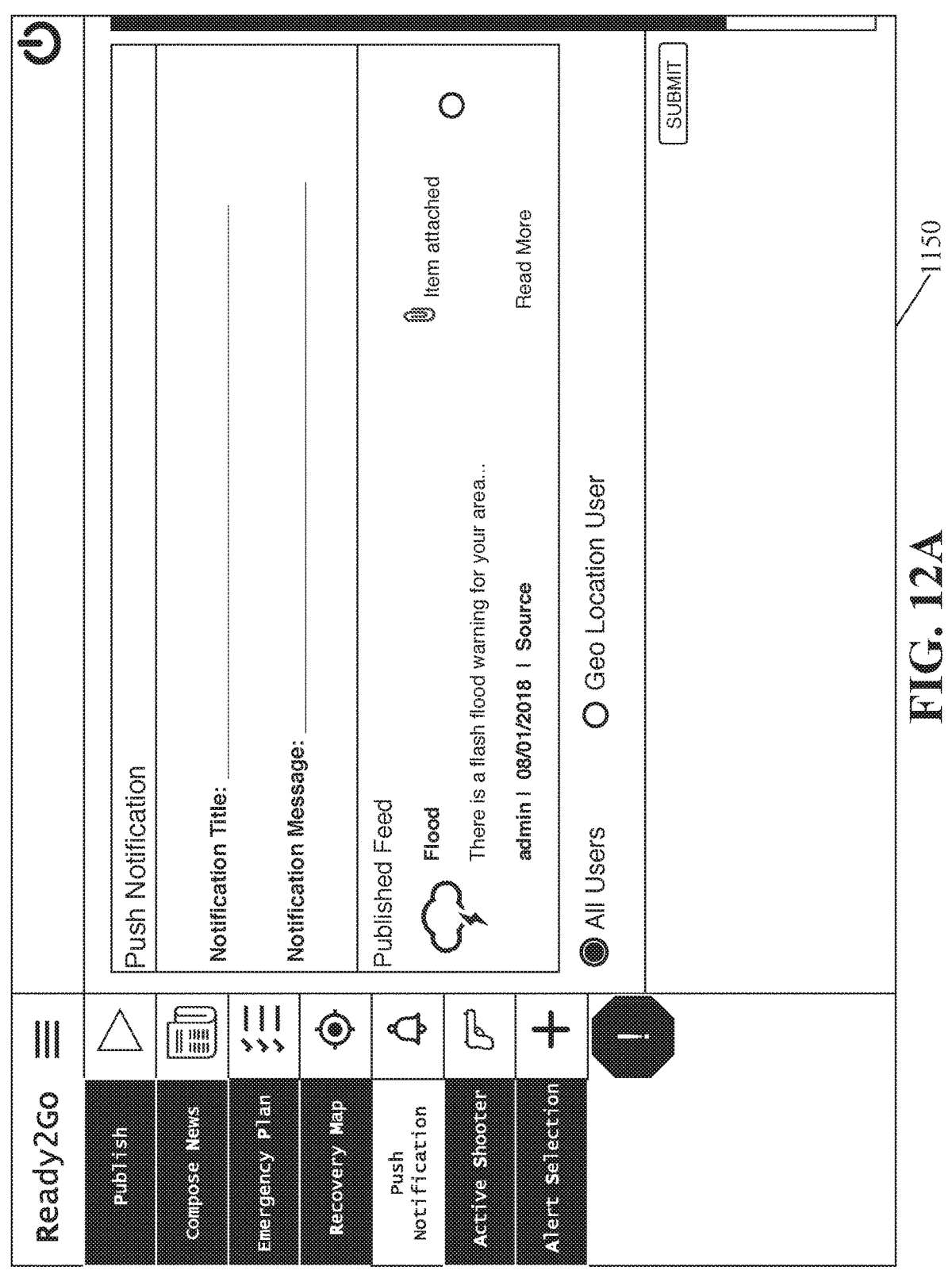
Figure 12B:
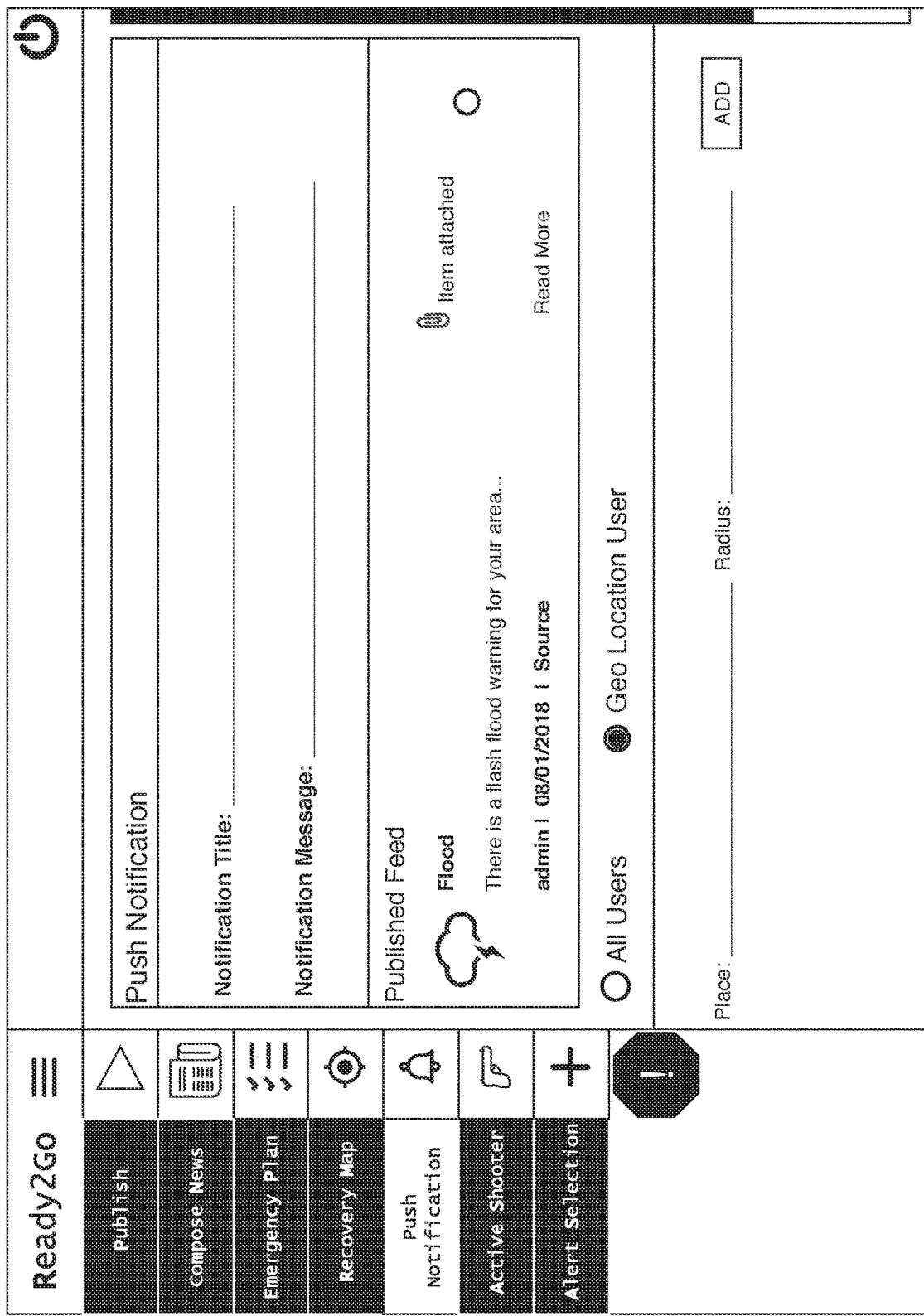
FIG. 12B is an illustrative example of an administrator interface of the system of FIG. 1.

FIG. 12A shows an interface 1150 which is a variation of the interface of FIG. 12. In FIG. 12A the administrator has the option of selecting between "all users" or "geo location users." In the implementation shown the administrator has selected all users, thus when the push notification is sent it will be sent to all users stored within the database. If the "geo location users" option is selected then the administrator will be able to either select from one or more predefined geo locations for this news feed item (or for news feed items in general) or, as shown in FIG. 12B, add a place and radius using input fields and/or selection using clicks and movement of a provided map. As indicated previously, the map may be a third-party provided map and thus the system may interface with software of third-party map providers. The input fields (such as the place and radius fields shown in FIG. 12B but, also, the input fields in general) may have predictive text features facilitated by the software, servers and database(s) such that as an administrator is typing in some text (such as "ala") the field shows nearby, such as immediately below, a number of predicted options to select from (such as Alabama, Alaska, etc.). The administrator may finish selecting the place and radius and the "add" option will then become selectable to define the desired geolocation with this news feed item which will be sent out by push notification.

Figure 13A:
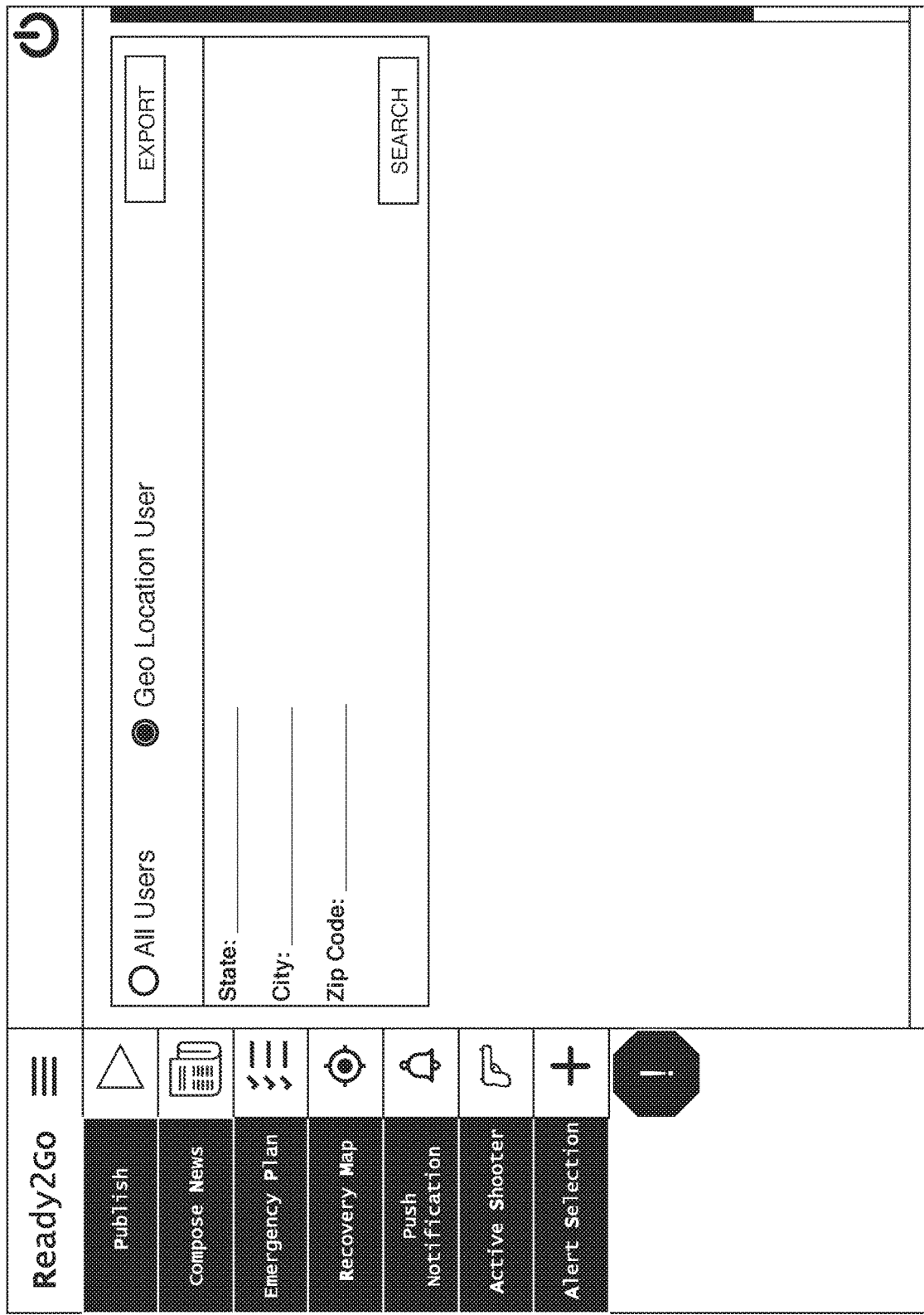
FIG. 13A is an illustrative example of an administrator interface of the system of FIG. 1.
Figure 13B:
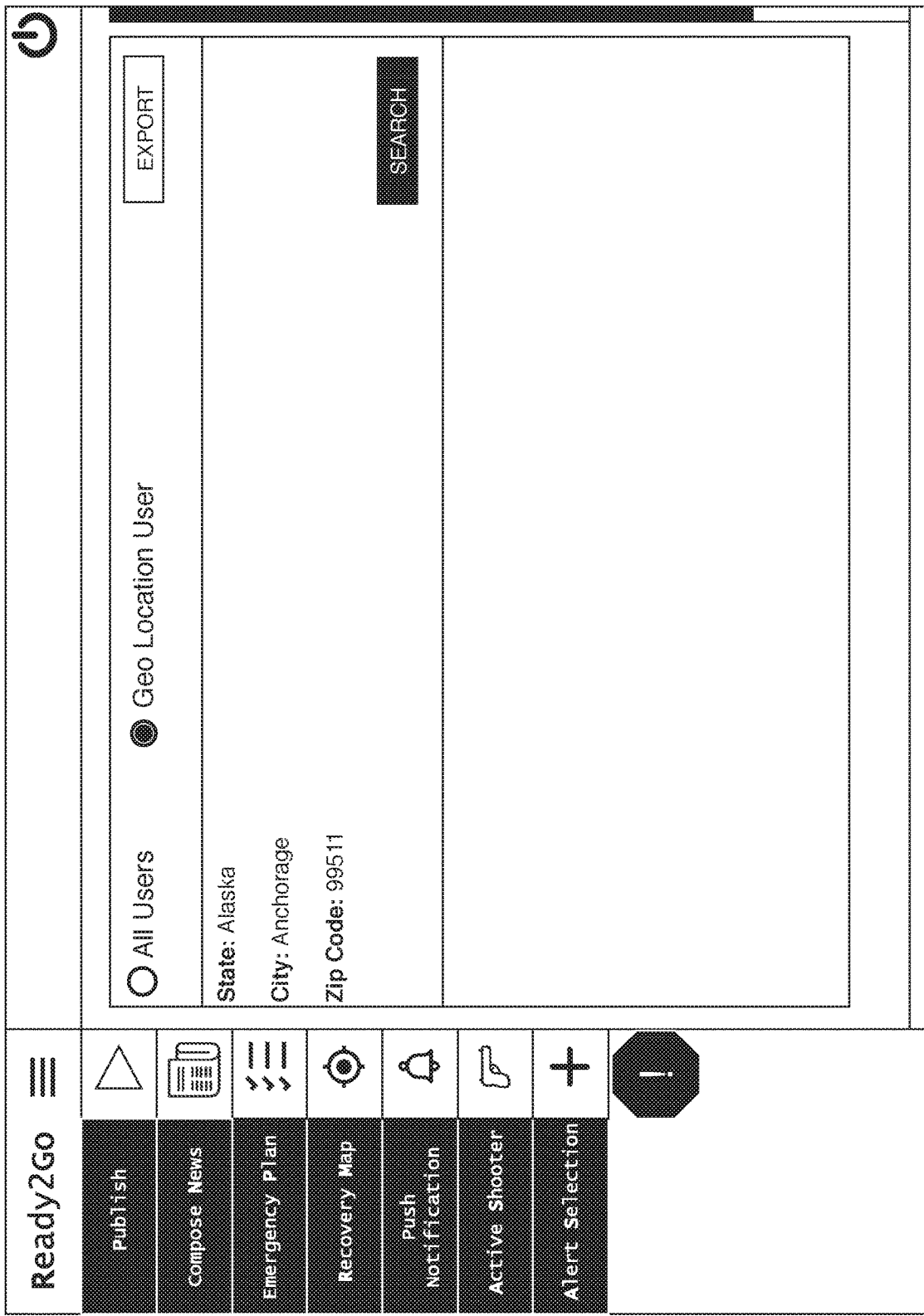
FIG. 13B is an illustrative example of an administrator interface of the system of FIG. 1.
Figure 13C:
FIG. 13C is an illustrative example of an administrator interface of the system of FIG. 1.

FIGS. 13-13C show a number of interfaces which are accessible using the associated menu item on the left side of the admin portal. In FIG. 13 it can be seen that through an interface 1300 an administrator may select all users in order to export a list of all users within the database, such as in a spreadsheet or other format, including user name, email, and phone number. FIG. 13A shows that a user may instead select "geo location user" to be able to search for users within a specific geographic location. For example in FIG. 13B the admin has identified a zip code within Anchorage, Ak., and the user may select Search to populate a list of all users within the database that are associated with that zip code through the database. Once this query is run the admin may export the list. For example in FIG. 13C the admin has searched for all end users within the city of New York, and now that the list has populated the admin may export the list, which in implementations may be exported as a notepad file, EXCEL file, comma delimited list, and so forth.

Referring now to FIGS. 14-17, end user interfaces accessed by end users are shown. These interfaces may be accessed by tablets, mobile phones, and so forth. Interface 1400 may initially show a loading page (displayed in FIG. 14 as simply a logo) and thereafter may display login fields for a user to login. Once logged in an interface such as interface 1450 shown in FIG. 14A may be shown. This interface is a menu which provides access to: a profile interface from which the user may edit profile information such as name, contact information, geographic area, etc.; a home menu item to return to the menu shown in FIG. 14A; a recovery interface which may allow the user to see an evacuation map and the like that has been sent to the user in conjunction with an emergency warning (such as the evacuation map described previously); a checklist (emergency plan) interface from which the user may view a checklist (emergency plan) sent to the user in conjunction with an emergency warning (this may be alternatively labeled "Emergency Plan" in some implementations); an active shooter interface from which the user may see active shooter notifications and related information sent to him/her and also may send an active shooter notification to the admin (such as using an admin-defined form, which the admin may have created using an admin-side forms wizard accessible through the admin portal); an "are we safe" interface from which a user may notify a predefined list of other users of his/her status; a 911 interface from which the user may contact emergency professionals such as police/fire department/etc. using a messaging feature and/or a phone call to proper contacts; and a logout feature to exit the application.

Figure 14:
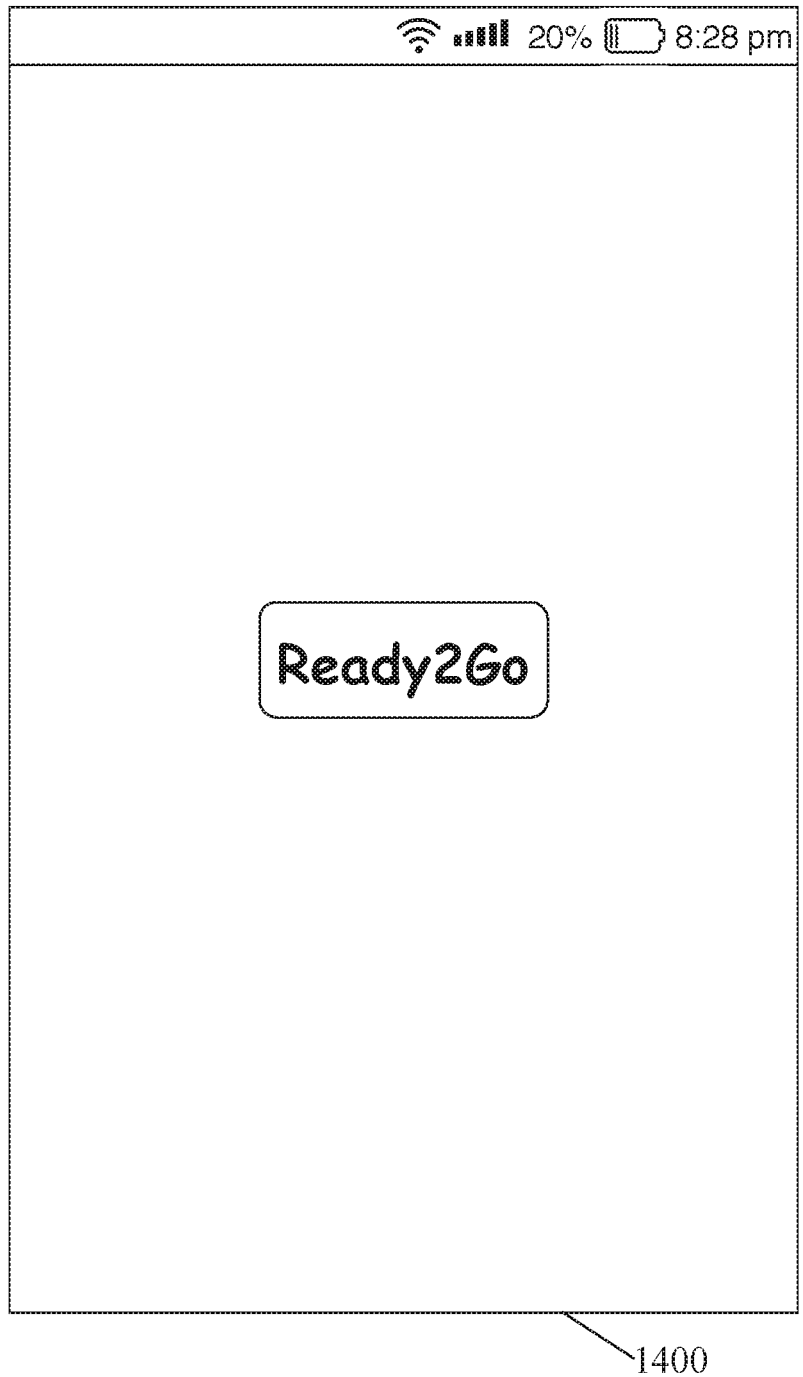
FIG. 14 is an illustrative example of an end user interface of the system of FIG. 1.
Figure 14A:
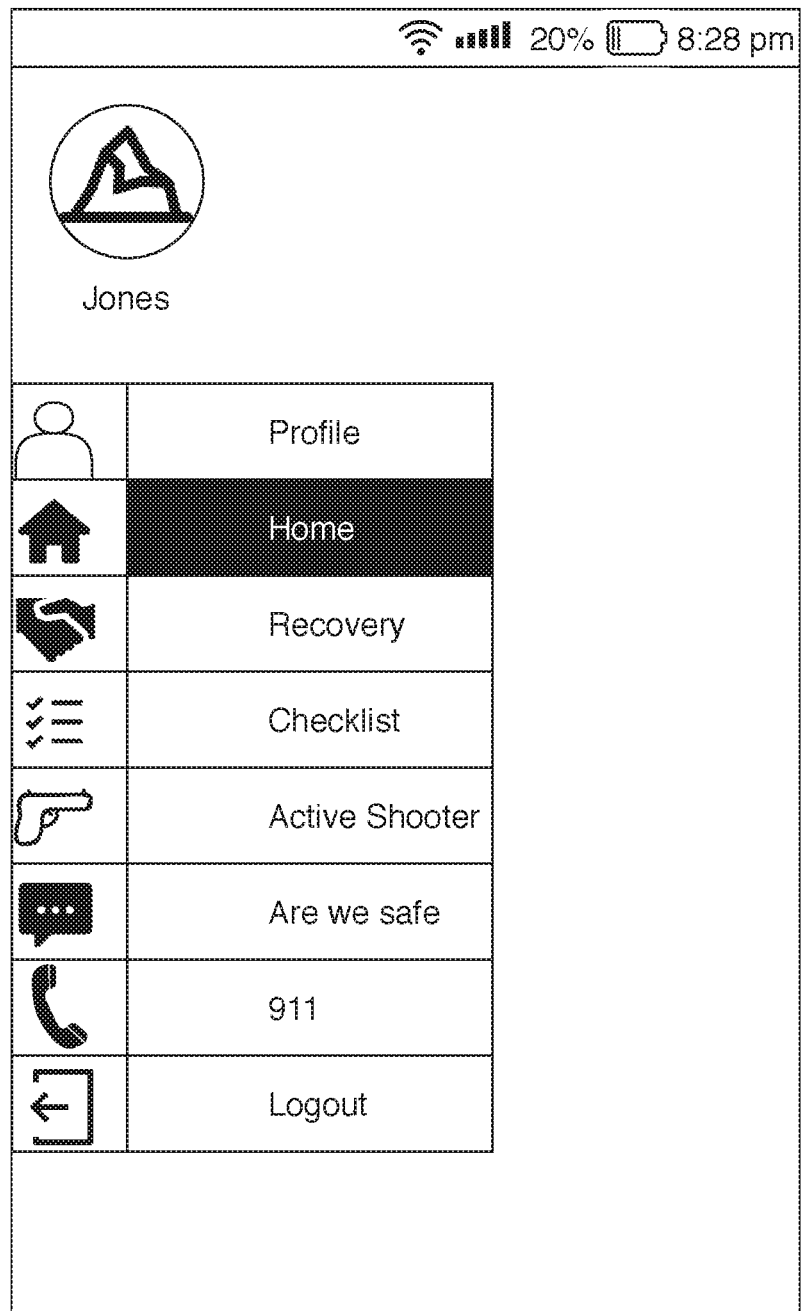
FIG. 14A is an illustrative example of an end user interface of the system of FIG. 1.
Figure 14B:
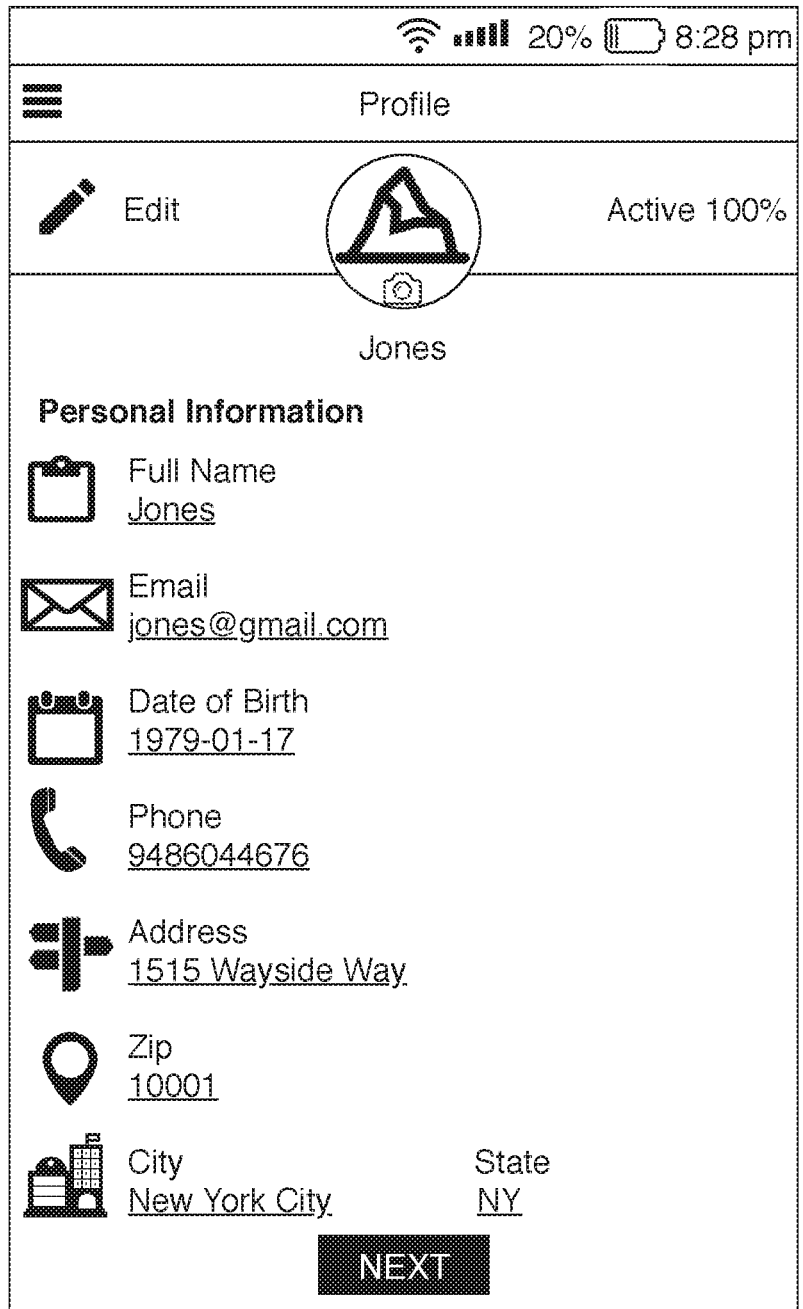
FIG. 14B is an illustrative example of an end user interface of the system of FIG. 1.

FIG. 14B shows that through the profile interface (interface) 1460 the user may select and edit a profile photo and various other profile information including a full name, email, birth date, phone number, and full address information. A blank template similar to that shown in FIG. 14B may appear the first time a user opens the app and pressing the Next button after completing the fields (or at least all required fields) may allow the user to continue to another screen, while selecting the three horizontal bar icon at the top left would return the user to the main menu. The user's activity percentage is also shown on this screen.

Figure 14C:
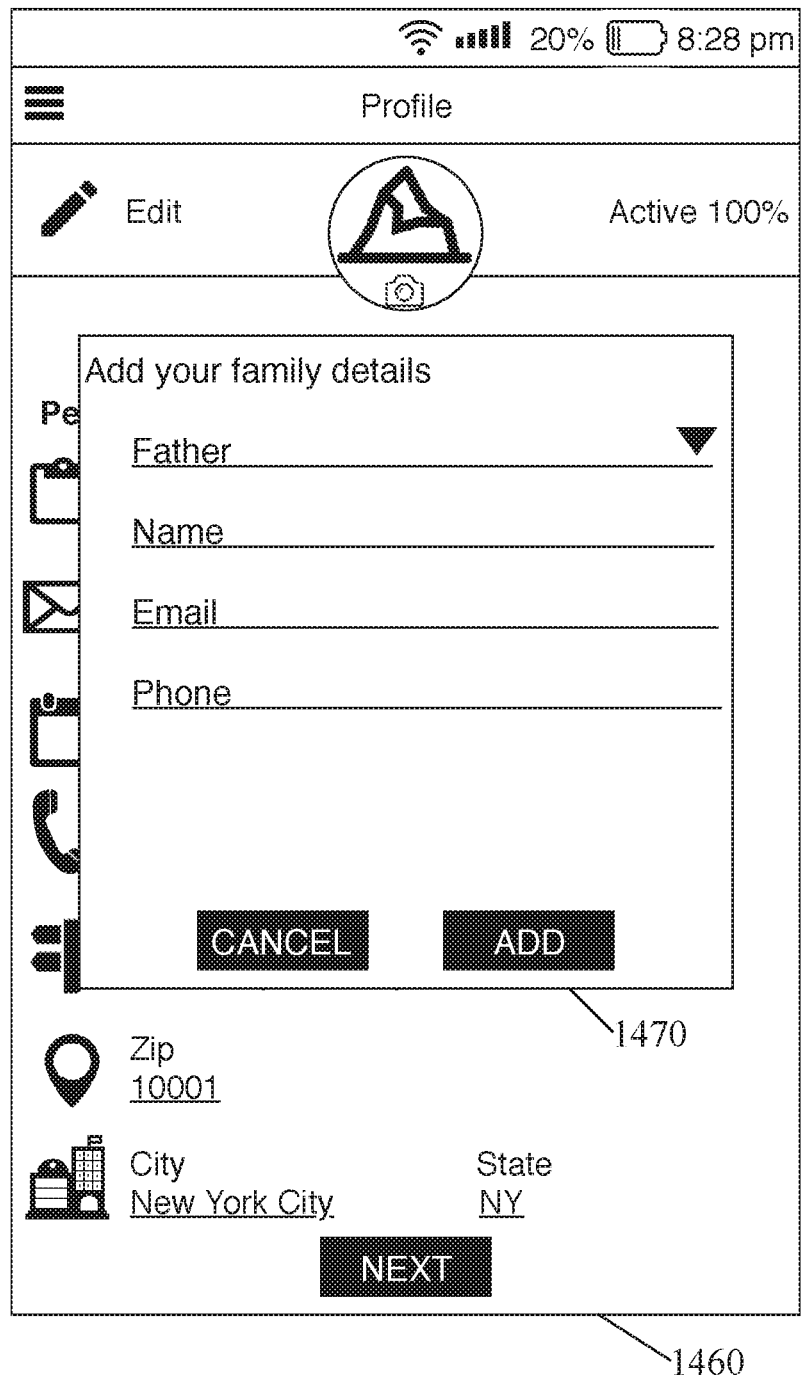
FIG. 14C is an illustrative example of an end user interface of the system of FIG. 1.
Figure 14D:
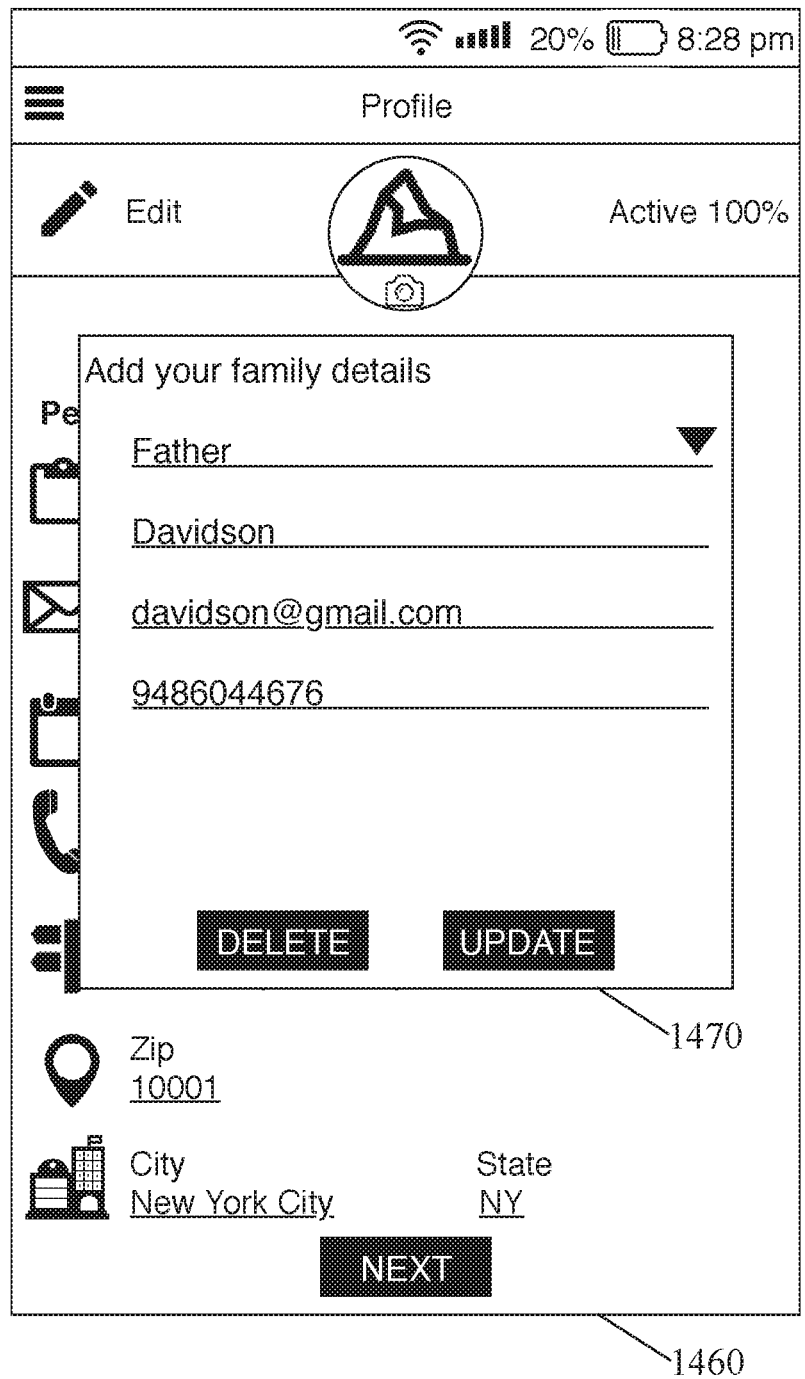
FIG. 14D is an illustrative example of an end user interface of the system of FIG. 1.
Figure 14E:
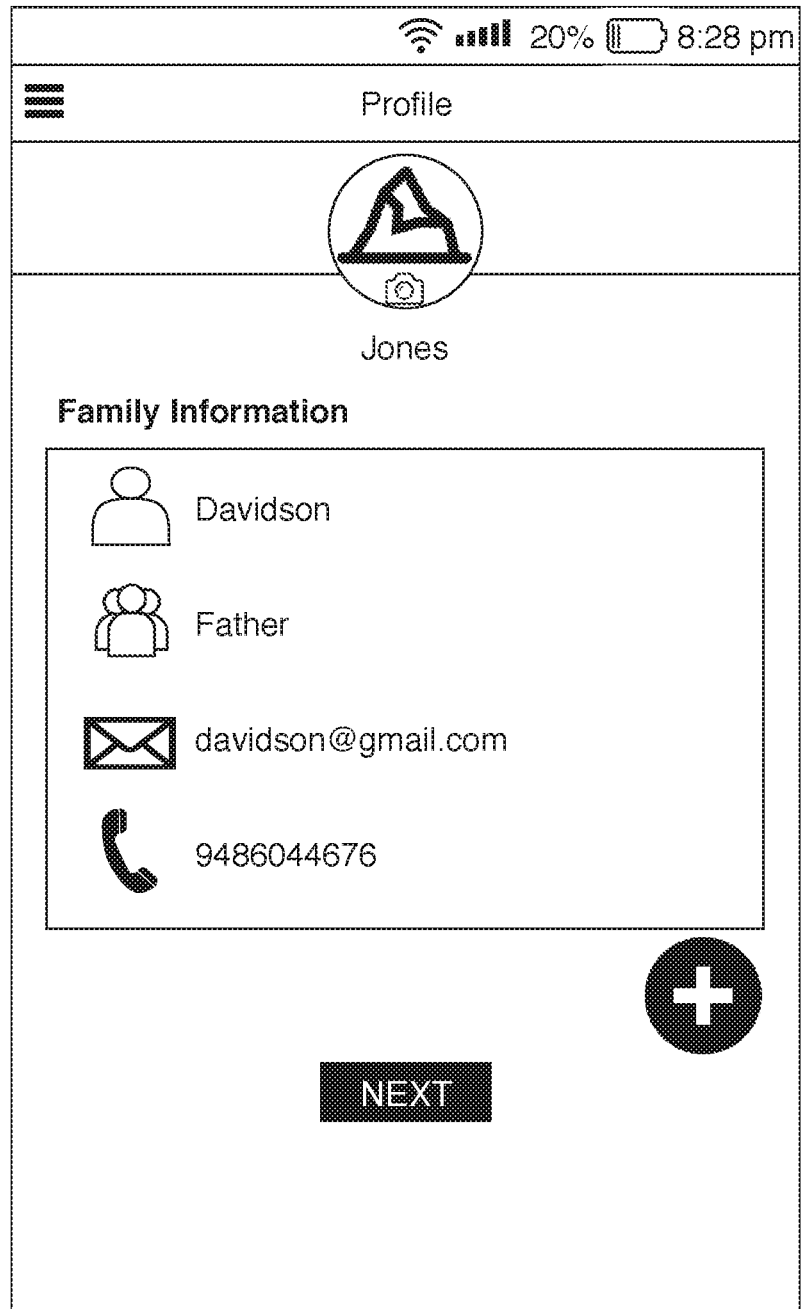
FIG. 14E is an illustrative example of an end user interface of the system of FIG. 1.

Upon pressing next the user may add family details using the popup interface (interface) 1470 of FIG. 14C, including defining a family relationship (father, mother, sibling, aunt, nephew, grandfather, spouse, etc.) which, in some implementations, may include non-family identifiers (coworker, roommate, friend, boyfriend/girlfriend), etc. In some implementations the user may manually type a relationship type. The user may then input the name, email and phone of the person and may either cancel or add the person. In FIG. 14D the user has input his/her father with the name "Davidson" and email and phone. Upon pressing next the interface 1480 of FIG. 14E is shown which displays the previously-input father information and at this point the user may use the plus icon to add others to the "Family Information" list or may select next to move on to the next screen.

Figure 14F:
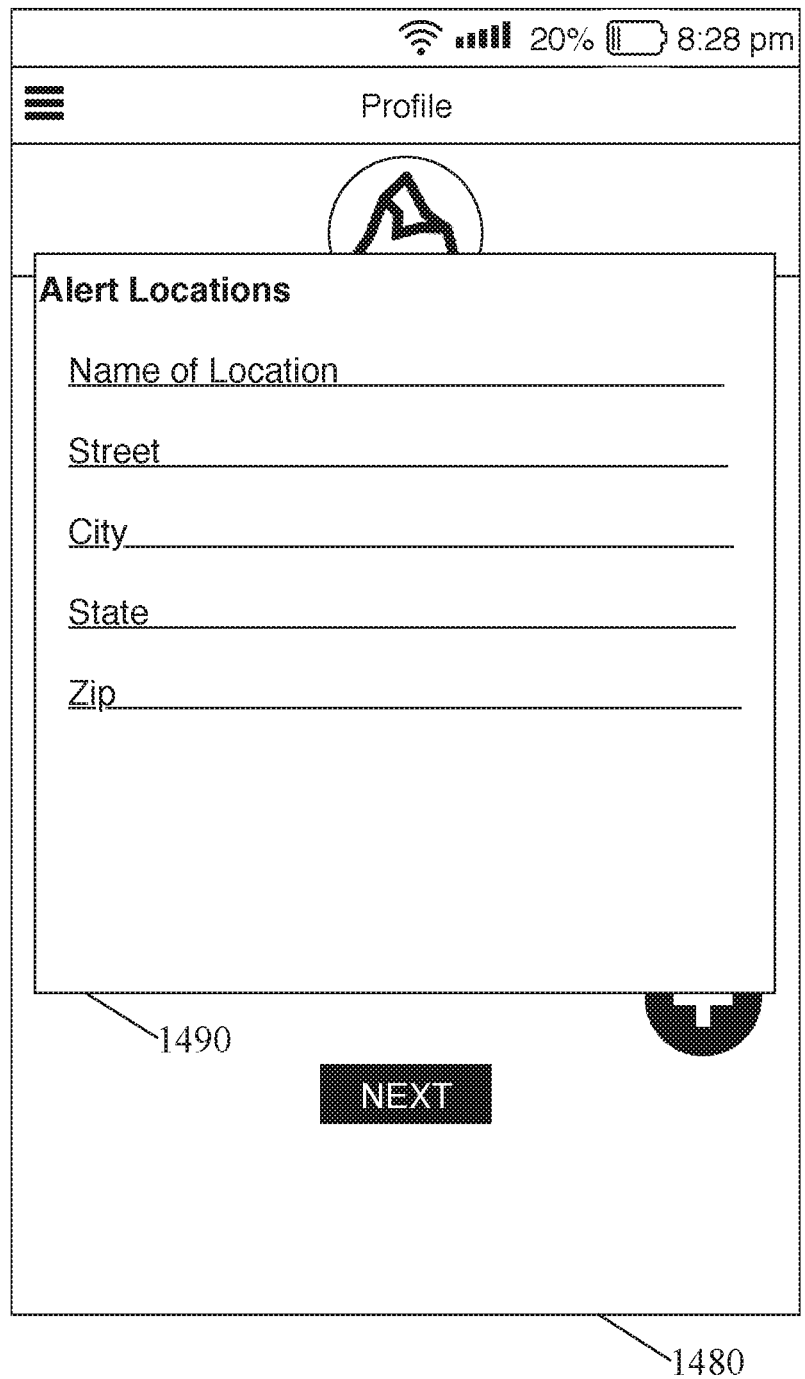
FIG. 14F is an illustrative example of an end user interface of the system of FIG. 1.
Figure 14G:
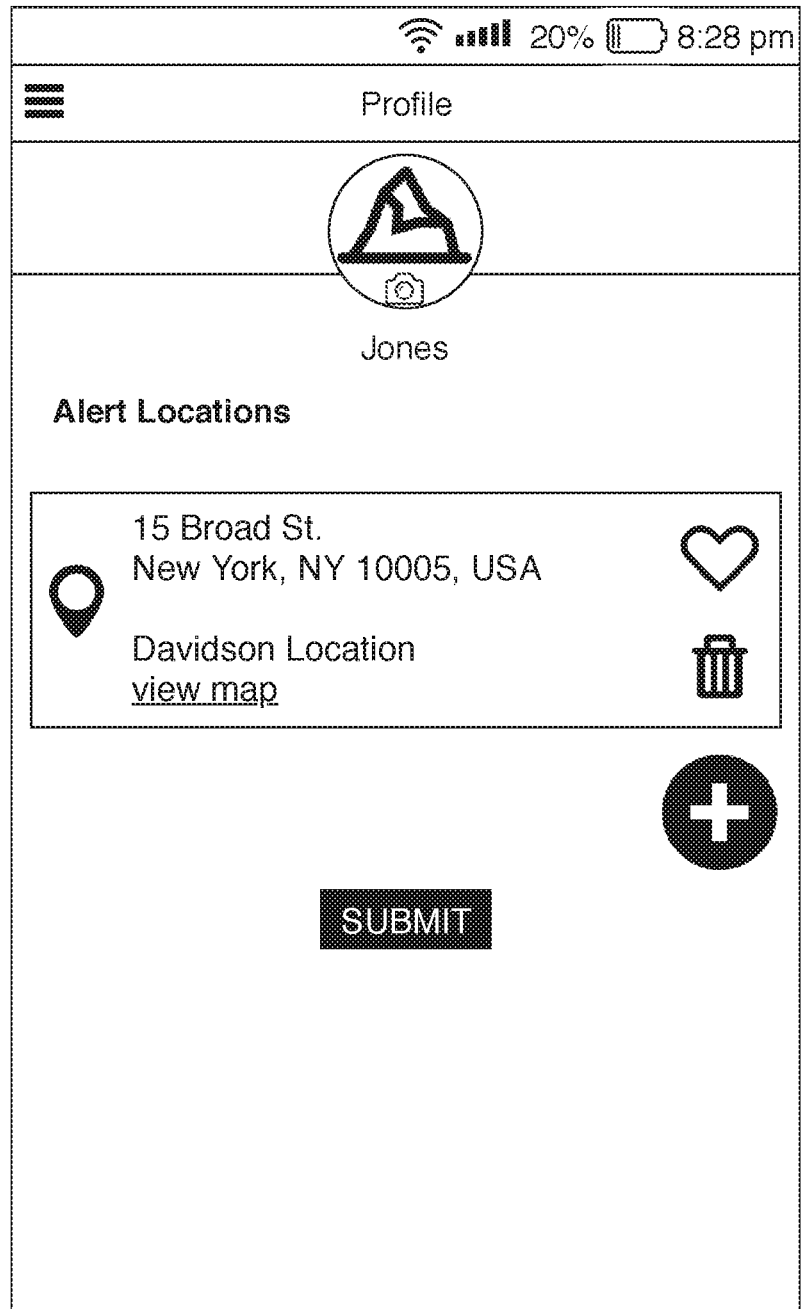
FIG. 14G is an illustrative example of an end user interface of the system of FIG. 1.

The next screen is shown in FIG. 14F which is a popup alert location interface 1490. From this interface the user may define locations about which the user would like to receive information. For example, the user could use his/her own geographic location, or in some implementations a user may want to also or alternatively include a geographic location of another person (such as by non-limiting example a disabled family member who lives in another location and who might need help during an emergency situation). The user may input a name of the location and add the full address of the location and then either cancel or add this location. In FIG. 14G interface 1492 shows the user's input information, and from this interface the user may use the plus icon to add more locations or may select Submit to complete the profile information. If the user has included multiple alert locations then, naturally, the user will receive notifications related to all of the entered locations. The user may delete a location using the trash icon, may "like" a location using the heart icon (which may make that location reside at the top of a list of locations or identify it as a home location) and may select "view map" to view a map of the location.

Figure 14H:
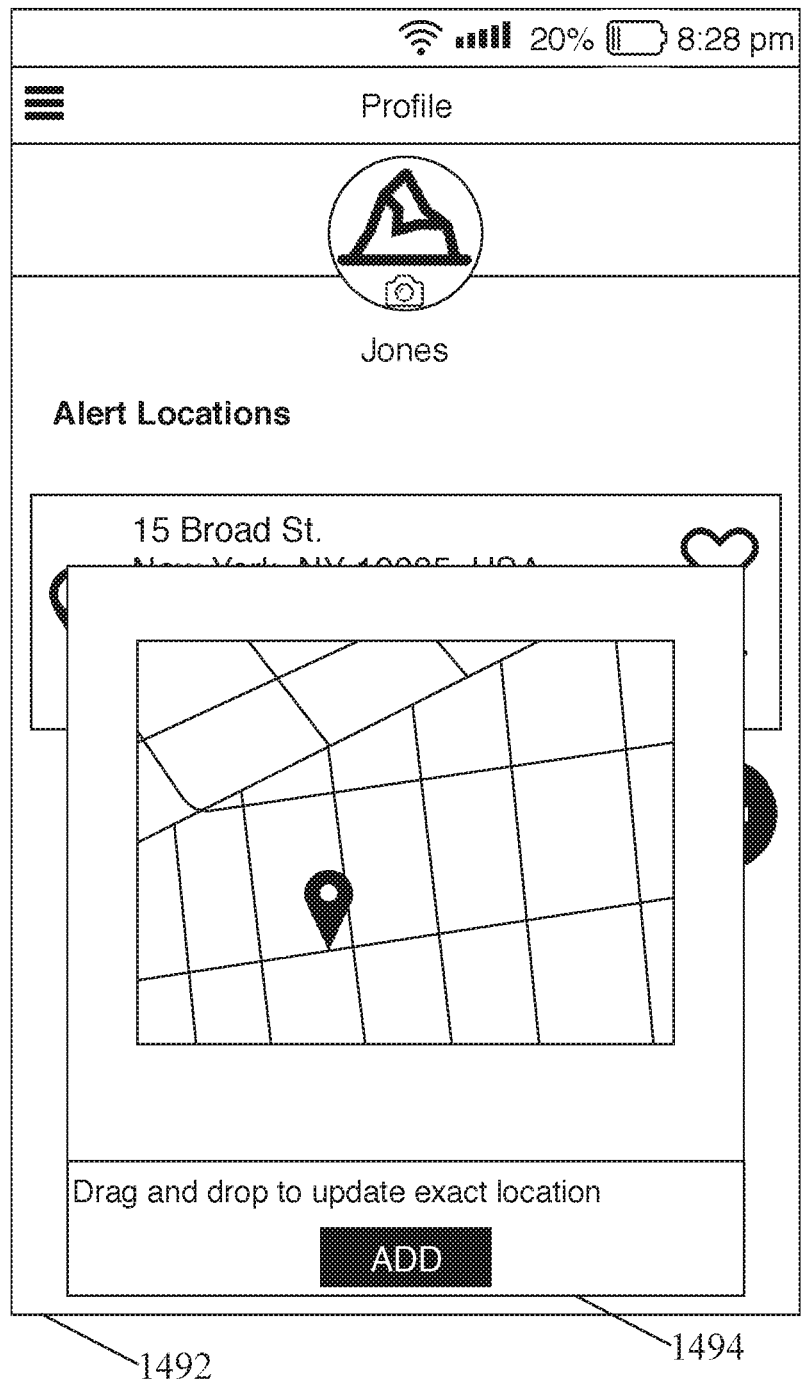
FIG. 14H is an illustrative example of an end user interface of the system of FIG. 1.
Figure 14I:
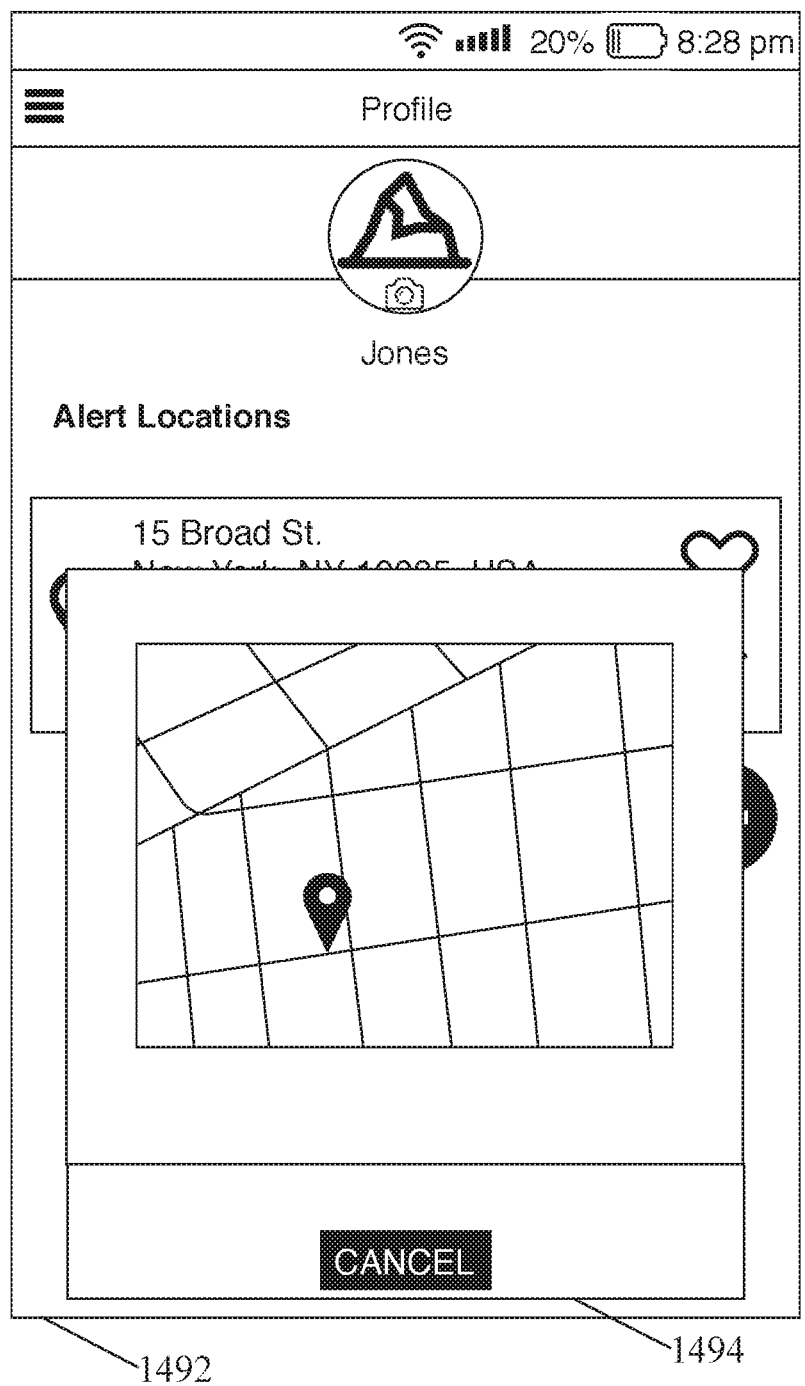
FIG. 14I is an illustrative example of an end user interface of the system of FIG. 1.

Upon selecting "view map" the popup interface (interface) 1494 shown in FIG. 14H is displayed, which allows a user to drag and drop a location marker to a more specific location, and upon pressing Add the location is updated, as shown in FIG. 14I. From this screen the user may select cancel if he/she wishes to revert to the previous location.

Figure 15:
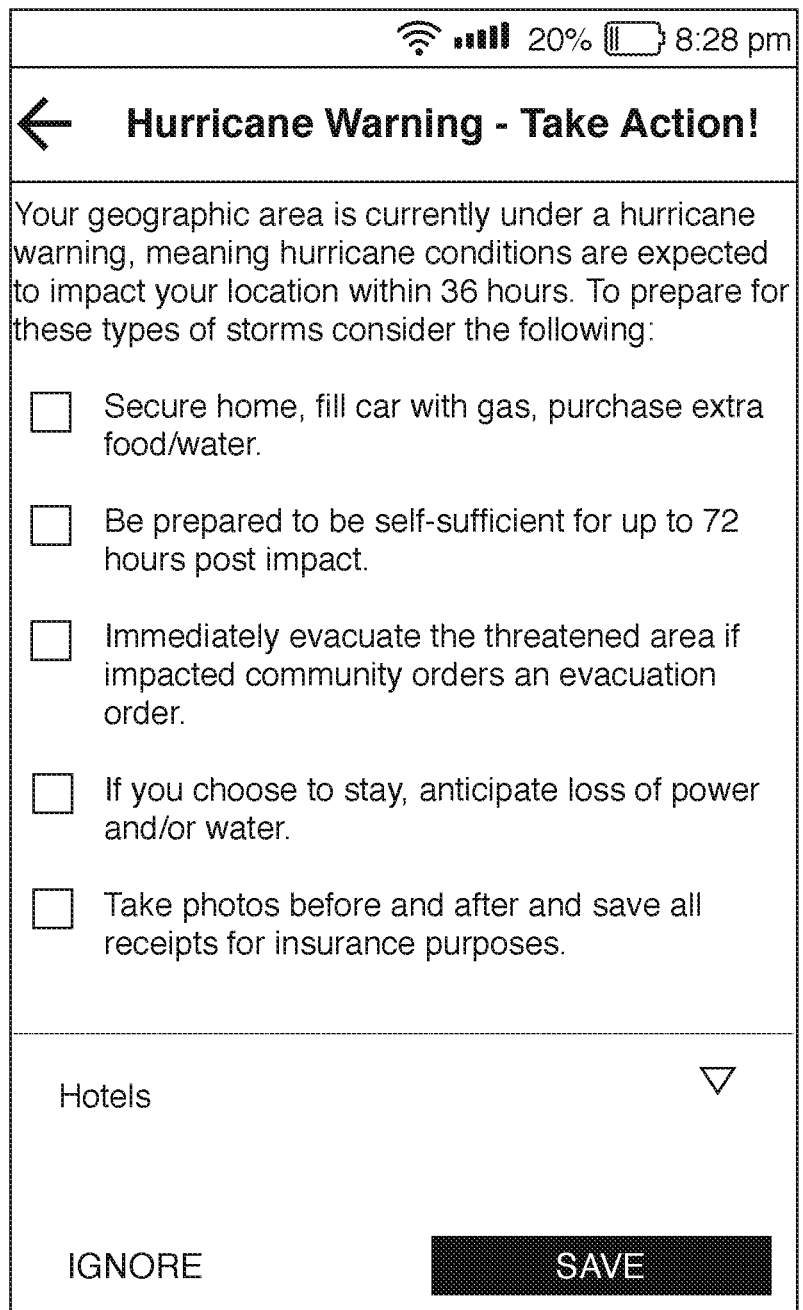
FIG. 15 is an illustrative example of an end user interface of the system of FIG. 1.

FIG. 15 shows an emergency plan checklist interface (interface) 1500 that is accessible by the end user by selecting the Checklist menu item shown in FIG. 14A (which, as indicted above, in other implementations may be an "Emergency Plan" menu item instead). The checklist has a title at the top and an arrow may be selected to return to a parent menu. Below the title is a description, and below this are a plurality of checklist items which are recommended to the user to prepare for the upcoming hurricane. The end user received this checklist, along with an associated news feed item previously described, because the user was in a geographically indicated area affected by the emergency described in the news feed item. The user may complete the checklist items and check each item off as it is done, and may at any time press the Save button to save the updated checklist, or select Ignore to ignore the checklist and the news feed item (for example, if the end user has already left the geographic area), and the user may also select a dropdown menu which is shown here showing the Hotels wording (other items may also be shown in this menu, such as pharmacies, gas stations, grocery stores, hospitals, etc., once the menu is dropped down).

Figure 16:
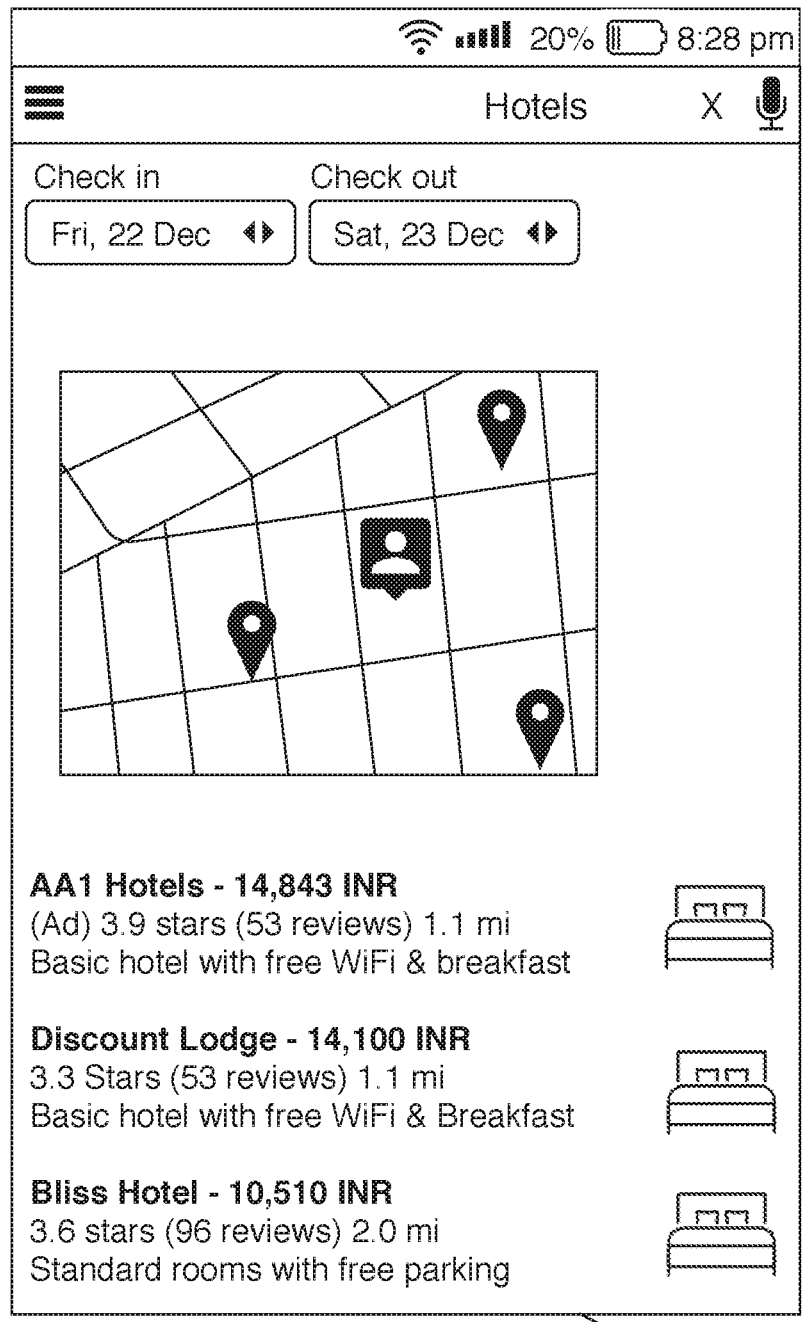
FIG. 16 is an illustrative example of an end user interface of the system of FIG. 1.

Upon selecting the Hotels item an interface 1600 shown in FIG. 16 is displayed which populates a list of nearby hotels, ratings, descriptions, amenities, distances from the user (such as within a 20-mile radius), rates (displayed here in Indian Rupees (INR)), a map displaying locations along with the location of the user, selectable check in and check out dates, and so forth. The check in and check out dates may allow a user to filter by locations available during those dates. The user may then select one of the hotels listed for more information or to contact the hotel to make a reservation either through the application or by phone call or otherwise.

The system may utilize third-party databases and software libraries and the like, such as to provide features as that shown in FIG. 16 which may utilize third-party mapping databases or software libraries (such as GOOGLE MAPS), hotel listing databases and software libraries, etc. A business or manager of the system may pay third-party database/software owners for the utilization of those services.

Figure 17:
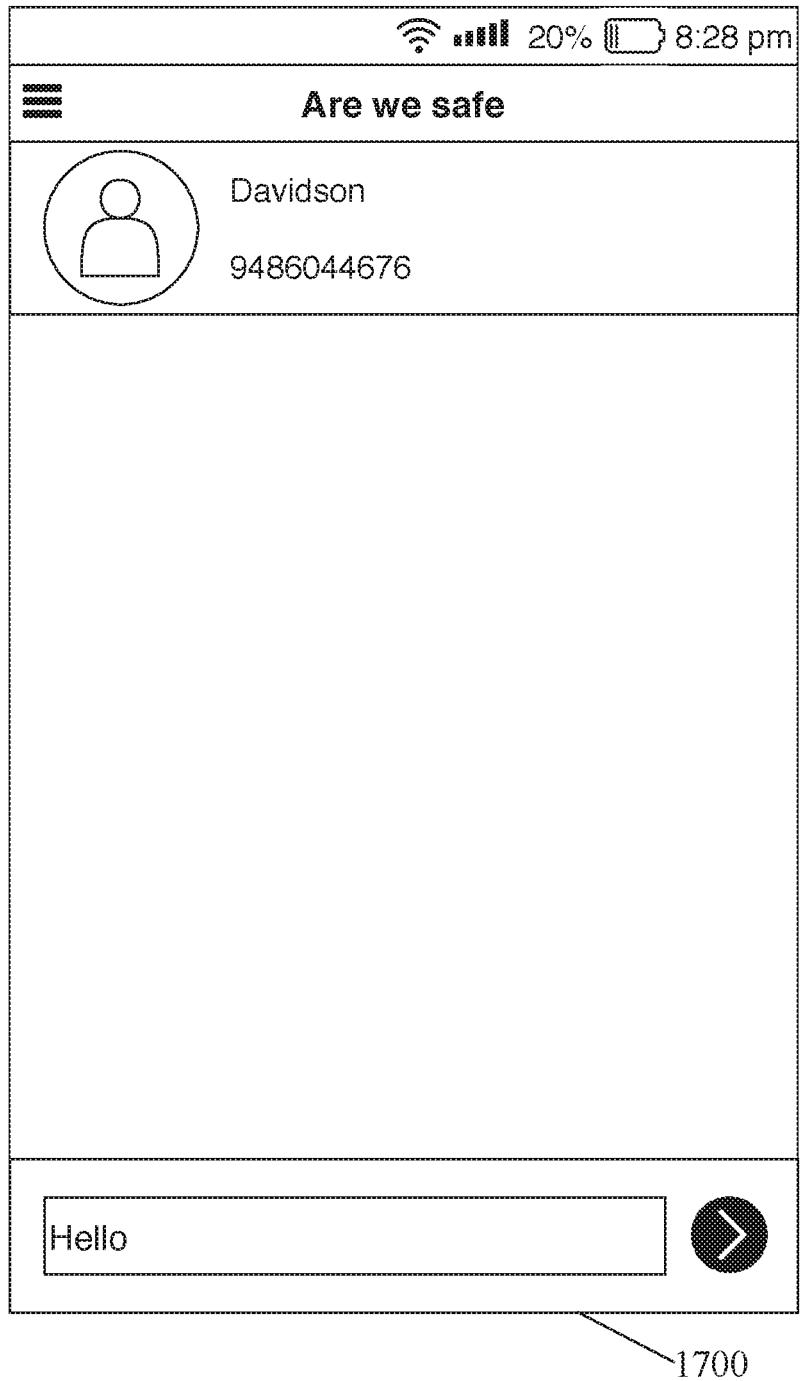
FIG. 17 is an illustrative example of an end user interface of the system of FIG. 1.

FIG. 17 shows an "are we safe" interface 1700 accessed by selecting the related menu item from the home menu. From this interface the user may see family members (and in some implementations persons with other relationships to the user such as coworker, friend, etc.) and may select from among the predefined family/friends/etc. (including selecting one or more persons) and use a messaging function to send those persons an SMS text. In some implementations, if those persons are also users of the system/software the message may be sent through an in-app messaging function. This feature allows a person to check in with family and friends during an emergency situation to indicate to those persons the status of the user, such as "I am safe" or the like. In some implementations the user could select from an admin-predefined list of short messages or could create a custom message. In some implementations the "are we safe" feature also allows the predefined family/friends/etc. to initiate a check-in on their end. So, for example, a person's father could initiate a check-in, which may result in a notification on the user's end, and when the user opens the notification the interface of FIG. 17 could appear, showing the initiated check-in request and the person who requested it, and from this interface the user may send a message to that person to indicate whether the user is safe and to indicate his/her location. In implementations the family member, friend, etc. may be able to see the user's location using the GPS position of the user's phone (which feature may in some implementations be disabled by a user for privacy, as desired).

In some implementations if any user initiates an "are we safe" trigger then all members of that person's family that are associated as family members with the initiating user through the database(s) (or all users in a predefined friends list, etc.) are prompted to check in until all family members or friends (or so forth) have checked in, and the system accordingly notifies each family member or friend of each other's safety status and location.

In implementations the system may also be configured to provide notifications to users related to Amber alerts and other relevant notifications from police or emergency personnel, and as described above the users may contact police or emergency personnel using the app to report any relevant information. In such implementations users could be given a license plate number and vehicle identification, and responding to the alert may be greatly simplified such as the ability to simply press a "located" button to initiate a communication to police if the license plate or vehicle was spotted, and this communication may automatically communicate to police the GPS location of the user initiating the contact so that police officers may head to that location. It is to be understood that the app may be used in any language and in any location worldwide, and the app may be designed so that upon downloading and installing it the user selects a home country and/or a home language so that the app and system for that user utilizes that person's language and information relevant to that user's location.

As described above, the system thus includes the aforementioned elements/interfaces and the like in the database and/or implements them using the server and the interfaces displayed on the displays of admin computing devices, end user computing devices (such as mobile phones), and allows end users to be more likely to be safe in an emergency/disaster situation, thus reducing the loss of life, reducing injury, reducing damage, and reducing the overall negative impact of disasters and emergencies on individuals and communities. It is to be understood that all the interfaces and functionality described above may be implemented using the system representatively shown in FIG. 1.

Although specific emergency/disaster examples are described and shown in the drawings, these are not meant to be limiting, as any type of disaster or emergency could be the subject of a news feed item or push notification to users. Accordingly, the types of disasters could include, by non-limiting example: tornadoes; severe storms; hurricanes and tropical storms; floods; wildfires; earthquakes; drought; incidents of mass violence; infectious disease or sickness outbreaks; volcanic eruptions; tsunamis; mudslides; avalanches; landslides; sinkholes; limnic eruptions; blizzards; heat waves; impact events and airbursts (such as asteroids and meteors); solar flares; other geologic processes; explosions; militaristic attacks; power plant crises including nuclear meltdowns; fuel or food shortages; electricity outages; and the like.

In implementations users may register using either a phone number or an email address. In implementations a user's location may be resolved using either an address input by the user or by a GPS location. In implementations some of the content is pushed to users (all users or users within a geographical location) from the servers but completion tasks (such as the storing of an emergency plan checklist, the updating of an emergency plan checklist, the location and contact information of nearby hotels, the sending of SMS messages to family and friends, etc.) are completed by the locally installed app on the user's device and/or using the inherent functionalities of the user's device without system server involvement.

In implementations there may be some gamification of the app to encourage items such as completion of a profile by a user and/or to help engage family members or help family members/friends/etc. to add themselves as users, to encourage checklist completion, and so forth.

In implementations safety checklists may be pushed to users in an active shooter situation, which may help the users remain calm and follow a checklist of items to reach safety and/or help others reach safety, which active shooter checklists may be admin-defined using the admin portal and may be pushed to users within a relevant geographic location through the system automatically in response to third-party notifications received at the server such as from law enforcement.

In some implementations the system will be configured to allow users to report non-emergency concerns to law enforcement. This could include, by non-limiting example, the ability to notify law enforcement of a minor crash, a loose dog, etc. In some implementations the system will be configured to allow reporting to other parties such as neighborhood watch programs—for example reporting a mysterious person wandering the neighborhood late at night or looking into yards or cars. In some implementations the system would allow users to form and/or join communication groups, for example all members of a neighborhood watch program who are also users of the system joining a neighborhood watch communication group through the system, so that a message or notification from any member of that communication group is sent out to all members of that communication group. Such communication groups could function similarly to the family/friend communication groups to some extent, as described herein, and users could join or leave communication groups as desired.

Alternative Admin Interfaces

While specific interfaces have been described in FIGS. 2-17 to show specific implementations of system 100 and related methods, it should be noted that other implementations can be implemented using other interfaces, as the information/functionality could be organized in different ways and/or additional functionality included and/or excluded. Example alternative interfaces used to implement system 100 and related methods are described below, with the details simply given in outline format as opposed to showing additional drawings (except for FIG. 18). Although these are only given in outline format, the practitioner of ordinary skill in the art will know how to implement these without additional drawings.

Figure 3:
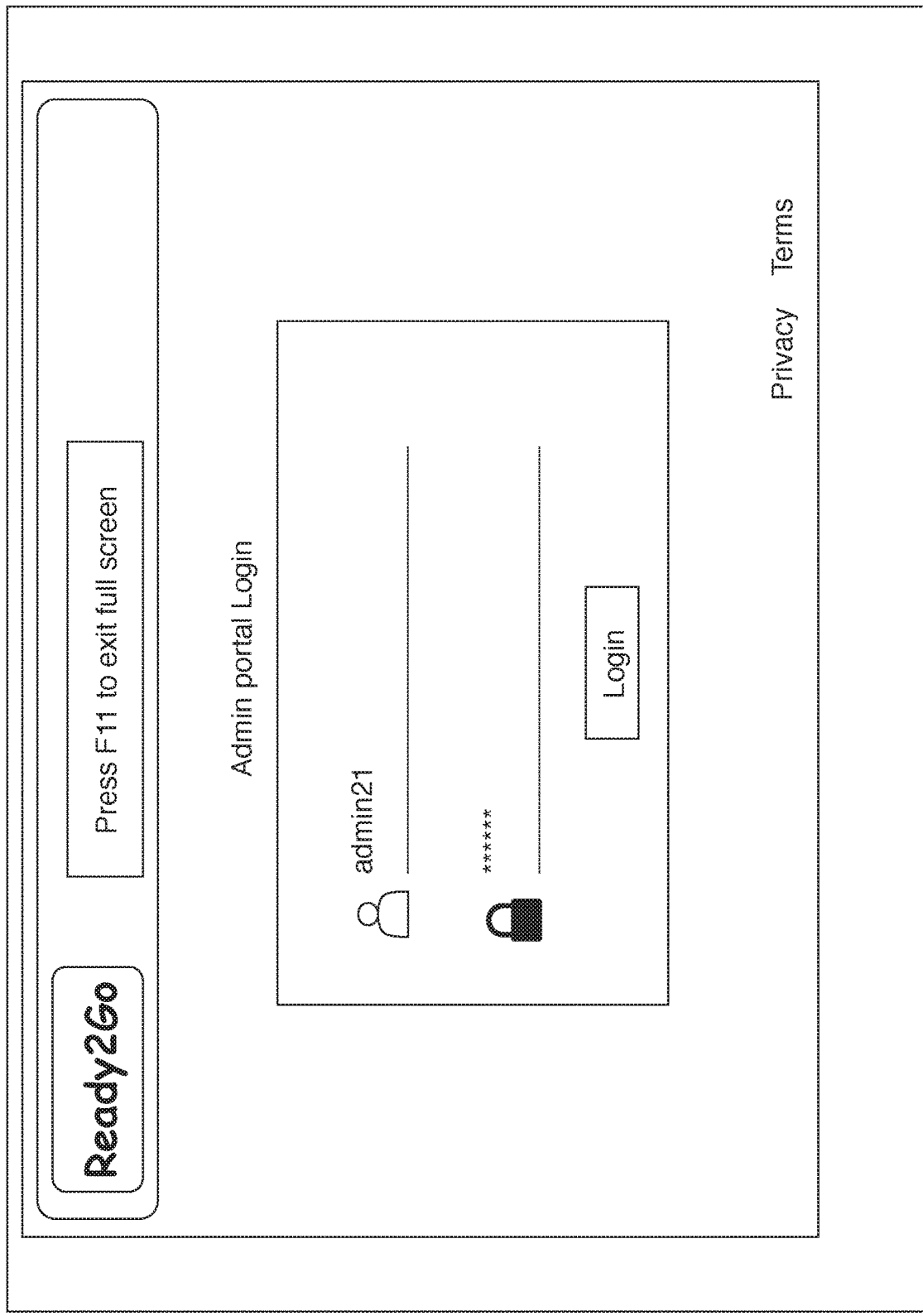
FIG. 3 is an illustrative example of an administrator interface of the system of FIG. 1.
Figure 18:
FIG. 18 is an illustrative example of an administrator interface of the system of FIG. 1.

In implementation of alternative administrator interfaces the login screen is similar to that shown in FIGS. 2-3, and is shown with interface 1800 in FIG. 18. The home screen after logging in is similar to that shown in FIG. 4 with a left-side menu and a top right logout selector (showing the user logged in as "Jones") which logs out the admin if "logout" is selected from a dropdown menu and returns the admin to the login screen. The logo and a menu collapser selector are present at the top left side, the menu collapser selector appearing as three bars at the top next to the logo. When an admin selects this selector it toggles the menu items below it between a horizontally expanded state in which the words and the icons are shown, and a collapsed state in which the words are removed and only icons are shown, the entire menu collapsing to the left to leave more room for the rest of the interface 1800.

In either case, when an admin has selected one of the menu items the interface for that selection appears in the window to the right of the menu and the menu item wording and/or the icon are shown with a different background color or shade to alert the admin which interface he/she is on. The following menu selectors are present: Publish; Emergency Plan; Recovery Map; Preparedness Info; Active Shooter; Weather Alert; Report; Settings; Members; User Group; and Communicator. The interfaces for each of these will be described in detail below. In implementations upon arriving at the home screen shown in FIG. 18 the Publish interface would be selected and shown by default. The Publish interface may also be shown when the Publish menu selector is selected while on any other interface. The menu items on the left are present regardless of which interface the admin is on, so that they may be selected from any screen. The Publish interface is shown in the drawings, but the remaining interfaces thereafter will only be described and not shown. Nevertheless, the practitioner of ordinary skill in the art will understand how to implement these other interfaces without further illustration.

Publish Interface

The "Publish" menu selector, when selected, brings up a publish interface 1802 in the interface 1800 to the right of the menu selectors. The Publish interface relates to news feed or push notification items that are sent to end users. The publish interface has three tabs: Published, Draft, and Compose. A filter dropdown is also present and allows the admin to filter those items that are shown on the selected tab, the filter dropdown has "All," "News Feed," and "Push Notifications" selectors. If an admin selects "All" then all items associated with a selected tab are shown. If "News Feed" is selected then only those items that are tagged as news feed items and associated with the selected tab are shown (i.e., things to show up in the end users' news feed on the mobile app, and which they may see if scrolling through news items). If "Push Notifications" is selected then only those items that are tagged as push notifications and associated with the selected tab are shown (i.e., more important items like emergency warnings which need to get end users' attention and should not only be placed in the news feed). Some items may have both the push notification and news feed tags. Each of the three tabs present in the Publish Interface will now be described.

Publish Interface>Published Tab

The Published tab when selected brings up an interface which shows items which have already been published to end users' news feeds and/or as push notifications. In FIG. 18 the Published tab is selected (thus shown as underlined). The published items are shown as summary list items each of which has an image or logo indicating either the source of the published item or the type of event (such as a hurricane image, a flood image, or some other image selected by the admin), a title, a small snippet of the wording of the published item, an indicator of who/what published the item (for some the term "Automation" may be used to indicate that the item was published automatically based on the settings the administrator set up), an indicator of when the item was published, an indicator of the source of the item (for instance a published item may indicate "Weather" for an NWS-triggered item), a trash can icon which the admin may select to delete the published item from this list, and a preview selector which the admin may select to see the published item in its entirety, which will further show the full text of the published item, the type of message (update or otherwise), the locations that the published item is tagged with, a start date/time and an expire date/time (the news feed or push notifications will be sent within the window and thereafter would no longer be sent to end users). A back selector is also included to return to the list of published items. The published tab interface lists a certain number of published items, such as 25-50, and at the bottom are First, Previous, 1, 2, 3, 4, 5, .... Next, and Last selectors to allow the admin to navigate to other pages of published items. In other implementations the list could perpetually scroll to show all items.

Publish Interface>Draft Tab

The Draft tab when selected brings up an interface which shows a list of draft items that have not yet been published to end users. These are given in list format similar to that described above for the list of published items, with each listed item showing an image or photo, a title, a summary of the body of the unpublished item, an indicator of the author, an indicator of when the item was first created and/or last modified, an indicator of the source (for example DHS if the unpublished item is a synopsis of a Department of Homeland Security publication or news release or warning), an edit selector which can be selected to allow the admin to edit the unpublished item, a copy selector which duplicates the unpublished item, a trash icon which allows for deletion of the draft item, a Preview selector which may be selected to see the full unpublished item, and a PUBLISH selector which an admin may select to publish the item to end users.

The edit selector, when selected, brings up a page which includes the following items: (1) a radio selector to select between news feed or publication; (2) a title which may be edited; (3) an image which may be changed; (4) a source URL which may be edited; (5) a text box in which a user may type, modify, and delete text, including several features such as bold, italics, underlining, list format, font sizing, and many others; (6) a recovery map selector which a user may select to link a previously-stored recovery map to this unpublished item (for example a "Winter Storm" recovery map); (7) a radio selector allowing an admin to select between publishing this item to all users, geo location users (users within a specified geographic location/range), or vendors; (8) a "News feed as push notification" which if selected will publish the item as a news feed item but also send the users a push notification to alert them to the news feed item; (9) a SAVE IN DRAFT selector to save the draft unpublished item; and (10) a PUBLISH selector which may be selected to publish the draft item to end users.

Referring back to the radio selector allowing an admin to select between publishing the item to all users, geo location users, or vendors, more functionality will be described. If the user selects all users then nothing appears between this radio selector and the next item ("News feed as push notification" selector). If "Geo Location User" is selected then a location input field, a radius input field, an add field (plus icon), and a map are shown below the radio selector. The location input field allows a user to type a location (upon selecting the input field the topmost suggested item is "Use Current Location" which will use the admin's GPS location, also "Recent Searches" are shown as selectable suggestions, and if the user instead begins typing then predictive text will offer suggestions based on the input). The user may thus input, for example, a city, county, state, country, province, and so forth. The radius input allows the user to input a radius for the notification in miles (or for non U.S. users this may be in kilometers). The plus icon may be selected to add this location. Once added, the map will show the selected location and radius, and a list item will appear which gives the location, radius, and number of end users within that radius (similar to FIG. 7E). The admin may additionally add other locations in this same manner, and the different locations will be shown in list format. If the admin hovers over any listed location a trash icon will appear which the admin may select to remove that location. Referring back to the radio selector, if the admin selects "Vendors" then instead of the location/map items a list of selectable vendors will appear (including dropdown sub-menus to select only certain groups or persons within certain vendor organizations, whereas selecting the topmost selector for any vendor may publish to all persons/groups of that vendor in the database) to allow the admin to select who to publish this to (the admin may set up vendors in another interface). In implementations an "Emergency Plan" linker/selector may also be included which allows the admin to link one or more previously-stored emergency plans to a draft item to be published.

Publish Interface>Compose Tab

If the Compose tab is selected an interface will appear which shows all items discussed above with respect to any draft unpublished item selected from the Draft tab, except that all entries start out as blank.

Emergency Plan Interface

If the "Emergency Plan" menu item is selected an interface will be brought up which includes a Published tab, a Draft tab, an Add tab, and a search bar allowing a user to search for an emergency plan by name. The tabs will be discussed below.

Emergency Plan>Published Tab

The Published tab shows, in list form, published Emergency Plans. Each listed plan shows a title and three icons, an eye to view the plan in its entirety, a copy icon to duplicate the selected emergency plan, and a trash icon to delete it. An example is an emergency plan titled "Family Fire Evacuation Plan," and if the user selects the eye icon the title is shown at the top. Below this a summary is given which includes a list of to-dos, as follows:

Every Household should have an emergency evacuation plan that has at least 2 evacuation routes and identifies a safe meeting place outside. Take a moment with your family and identify the following: (1) 2 evacuation routes from each room. The primary route should always be doors that are frequently used. The secondary route should take into consideration that the primary route is not an option. (2) Identify a safe meeting place outside the house. Good locations are a tree or mailbox at least 10 feet away from your home. (3) Identify and inform neighbors where children can go if separated from their parents. (4) Add all family members to the READY2GO "Are We Safe" feature and test at least twice a year. (5) Complete this document and save it in an emergency preparedness folder/binder to review at least twice a year.

An OK selector is available, and upon selecting this the emergency plan is closed and the admin is returned to the list of published emergency plans.

Emergency Plan>Draft Tab

Upon selecting the Draft tab the interface shows a list of draft emergency plans, including for each a title, an eye icon to show the full plan, an edit icon to edit the plan, a trash icon to delete the plan, and a publish icon (arrow) to publish the plan. "Published" for the emergency plans simply means that the emergency plan is now accessible by end users from their apps (it may be sent with or without a related notification). When the edit icon is selected an editable version of the draft emergency plan is brought up in a popup interface which includes an editable title, an editable description, and any number of "emergency items" which may be edited or deleted with a trash selector, and additionally new items may be added (these are essentially list items) by selecting a plus icon, and a CANCEL icon allows the admin to cancel the changes while a SAVE icon allows the user to save the changes.

Emergency Plan>Add Tab

Upon selecting the Add tab the interface shows the same items that are shown when the admin selects any specific draft emergency plan for viewing, except all fields are blank. Additionally, the Add tab further includes a PREVIEW selector which may be selected to bring up a preview of the emergency plan, a SAVE selector to save the emergency plan as a draft, and a PUBLISH selector to save the emergency plan as a finalized emergency plan and make it accessible to end users through the mobile app.

Recovery Map Interface

If the Recovery Map menu item is selected, an interface will appear which includes an Add tab, a Draft tab, and a Published tab, discussed below. A recovery map as discussed herein is normally an evacuation map.

Recovery Map>Add Tab

Selecting the Add tab brings up input fields for a map title, a source location input field (which may have predictive text, current location, previous searches, and other features), one or more intermediary waypoint input fields, and a destination field (both waypoint and destination fields having similar features as the source location input field). A map is shown (which may be a third party map, as with any other map discussed herein, such as a GOOGLE MAPS map allowing moving and zooming and so forth), which will show the route specified, and a SAVE IN DRAFT selector will save this recovery map as a draft. A PUBLISH selector may also publish the recovery map as a finalized map. "Published" for this interface simply means finalized—the map would still need to be linked to one or more communications from the PUBLISH interface (described above) to be sent to end users.

In implementations the starting and ending place must first be input, and then a new input field "Enter between places" will appear which allows the admin to add an in-between location (waypoint) and an "Add Waypoints" selector which allows the admin to add more waypoint input fields for more waypoint locations, and adding any waypoint will change the route accordingly. The map will update to show A, B, C, D, etc., locations (labeled starting with A as the starting location). In implementations after any information is input at the Add tab (such as a title or a starting or ending location) the SAVE IN DRAFT selector becomes highlighted, meaning it can then be selected, whereas previously it was in a lighter tone indicating there is nothing to save.

Recovery Map>Draft Tab

The Draft tab, if selected, shows a list of previously drafted recovery maps in list format, including for each a title, an eye icon to show the draft recovery map, and a trash icon to delete the map. In implementations a Publish icon will be included to publish the map as a finalized map. If the eye icon is selected a popup interface will show the starting point, end point, and waypoint(s) (and in implementations the route map), and an OK selector to close the popup interface.

Recovery Map>Published Tab

The Published tab, if selected, shows a list of previously published (in other words finalized) recovery maps in list format, including for each a title, an eye icon to show the published recovery map (which if selected shows the same things described above for the draft maps) and a trash icon to delete the map.

Preparedness Info Interface

The Preparedness Info selector, if selected, brings up an interface including Published, Draft, and Add tabs, described below.

Preparedness Info>Published Tab

The Published tab when selected shows a list of published (i.e., finalized and accessible by end users) Preparedness Information items, including for each a title, an eye icon to show the full item, and a trash icon to delete the item. Each Preparedness Information item is similar in some ways to an emergency plan, and may include information and links, and may after being published be attached or linked to in a published news feed or push notification item sent to end users (though it will also be accessible permanently through the mobile app).

Preparedness Info>Draft Tab

The draft tab shows a list of draft Preparedness Info items and includes, for each, a title, an eye icon to show the full text of the item, an edit icon to edit the draft, a trash icon to delete the item, and a publish icon (arrow) to publish the Preparedness Info item (i.e., finalize it and make it accessible to end users through the mobile app).

Preparedness Info>Add Tab

The Add tab when selected brings up an interface which includes a title field and a body field including text modifiers (font size, bold, italics, etc.), and once anything is typed in either field the PREVIEW, SAFE IN DRAFT, and PUBLISH selectors become selectable, and operate similarly to those described above for other selectors.

Active Shooter Interface

The Active Shooter menu item, when selected, brings up a list of active shooter notifications sent from end users to the admin. These are given in list format which includes, for each one, a name of the user sending it, the date and time sent, whether or not a sound was heard (such as gunshots), and a location where the user was when the notification was sent (or an indication that no location information is available). A map is also shown which pinpoints locations of all notifications sent. In implementations this interface may initiate a notification to an admin indicating whether the user is in an active shooter situation (regardless of whether the user has heard gunshots).

Weather Alert Interface

The Weather Alert menu item, when selected, brings up a weather alert interface which includes a search bar to search listed weather alerts, and for each weather alert a title (such as "Immediate Evacuation," "Severe Thunderstorm Warning," etc.), a description icon which when selected shows the full text of the weather alert, a news feed selector to add or remove the News Feed tag from the weather alert, and a Push Notification selector to add or remove the Push Notification tag from the weather alert. An edit icon and trash icons may also be included for editing and deleting weather alerts. An Add icon may also be used for adding new weather alerts. A SAVE icon may be included for saving changes when an admin simply changes the News Feed or Push Notification tags from the list view. The Weather Alerts may be linked to or attached to a published news feed or push notification item sent to end users.

When the edit icon is selected for any weather alert the user may edit the text of the alert. The weather alert may, for example, give a description of a weather emergency and a checklist of items that end users should consider doing to prepare for the emergency. By non-limiting example, the admin may be able to include text and a checklist not unlike those shown in FIG. 15. In implementations when such a checklist is included, it may or may not be an interactive checklist—in some implementations it may simply be a bulleted list, while in others it may include items to receive checkmarks or other "done" indicators which are stored in the database(s) or locally on the end user device as described elsewhere herein.

The weather alert interface, in implementations, is for the setting up of automated weather alerts to end users. These in implementations may be based on NWS weather notifications, with the system being configured so that when an NWS weather notification is issued, the one or more servers receive the notification and automatically send out one of the weather alerts to end users whose geographic locations based on GPS or on selected locations are within the area affected by the weather event. For example when an NWS weather notification about a hurricane is received at the server(s), a hurricane-related weather alert set up by the admin using the weather alert interface will automatically be sent as a push notification to end user devices of end users who have a geographic location in the database that correlates with the current or future location of the hurricane or, alternatively or additionally, appear in the news feed of those users when they next log into the app. Whether the weather alert is in the news feed or sent as a push notification depends on the news feed/push notification tag selections of the admin, described above, and the admin may choose one or both methods for a given weather alert.

In some implementations the one or more servers may use APIs or the like of the NWS or other emergency/weather notification provider to determine when an automated notification such as a weather alert needs to be sent to end users. Weather events could also be determined by regularly polling NWS servers or an NWS website or the like, for example one minute polling (polling once every minute) or the like could be used.

Although the weather alert interface is described as sending out notifications related to weather events, a nearly identical interface could be used for sending out automated notifications related to other types of emergencies, such as any type of emergency described elsewhere herein, and for weather or any other type of emergency the triggering event may be data from any external server or website or API or the like, such as a server or website operated by Homeland Security, local or national law enforcement agencies, any weather organization, any news organization, any local or state or federal government agency, any non-governmental agency, and so forth.

Checklists of any type disclosed herein (including interactive and non-interactive) may be sent as attachments to notifications or news feed items (which end users may need to get to by clicking through one or more links on the notifications or news feed items) or as described above may be included in the body of news feed items/notifications directly, so that the end users do not have to click through to get them (thus reducing the number of interactions to get to the checklists, which may increase the likelihood of users using the checklists).

Report Interface

The Report menu item, when selected, brings up a report interface which includes a list of users, either all users or users within a selected geographic range, and which can be exported. A search bar is also included for searching for a specific user. The list includes user names, emails, phone numbers, states, and indications of whether their profile is complete and whether their emergency plan is complete. Trash icons are included to delete any profile. The list may show only 25-50 with pages that may be navigated to by navigation items at the bottom to move between pages, as described above for other interfaces. The list may be exported in various formats as described above for other lists. In implementations a subset may be selected using selection boxes for export and/or filters may be included for finer filtering.

Settings Interface

The Settings selector, when selected, brings up an interface having a Basic Information tab, an Automation tab, and an Email Notification tab, described below.

Settings>Basic Information Tab

The Basic Information tab includes fields to insert and edit profile information for the administrator, which includes name, email, address, phone, city, state, company logo (or URL link to the same), website, and a SUBMIT button to save.

Settings>Automation Tab

The Automation tab includes a selector to turn automation on or off, a slider to edit the alert range in miles (or km), and a SUBMIT button to save these settings. The automation may function by a lower admin or third party admin allowing automation by a higher-up admin. For example, the system may have an overall admin who sets up some underlying features for all corporate admins (each having their own deployment of software for running a version of the system), and the corporate admin may, by turning on automation and selecting the range, simply accept all alerts sent out by the overall admin related to all emergencies that fall within the range. In other implementations the corporate admins may set up and send out their own in-house drafted alerts/notifications. In other implementations turning on automation simply allows the automatic sending out of notifications to end users when weather alerts are received, such as through NWS, including blizzard, earthquake, excessive heat, flood, hurricane, and tornado (and possibly other) warnings.

Settings>Email Notification Tab

The Email Notification tab includes an input field to enter an email and an ADD button to add it to a list of emails for receiving notifications for the admin. Also shown is a list of already added emails along with an edit and delete selector for each one.

Members Interface

The Members selector, when selected, brings up an interface having an Add Members tab, a Bulk Upload History tab, and a Search Members tab. The Add Members tab includes a dropdown role selector to select the role the member has, which may define rights within the software (Admin, Super Admin, Vendor, User), and includes fields for a full name, email address, residence address, and phone, and a CANCEL button cancels the input while a SAVE button saves it. The Bulk Upload History tab shows a list of bulk upload statuses (such as in progress or finished and a date/time stamp). The Search Members tab allows for searching by user type (Admin, Super Admin, etc.) and name/zipcode/email, then allows exporting the data.

User Group Interface

The User Group selector, when selected, brings up an interface having a Group Name tab and a Compose Group tab. The Group Name tab includes a dropdown menu with selectable vendors, and a search bar is also included to search for a vendor. Once selected, the groups defined for the vendor are shown, showing for each group: a title; a user count; the vendor name; an eye icon to see a popup interface showing the full group details (user names or titles, emails, phone numbers, and vendor name and contact info) including a search bar for searching for a specific vendor group member and an export button to export the list (and an OK button to close the popup interface); an edit icon to edit the group details such as image, group name, and vendor, and to add users, remove users, cancel or save; and a trash icon to delete the group. The Compose Group tab, when selected, brings up the same things as the aforementioned edit icon, except all fields are blank so that the user can enter a group name, upload an image, and select a vendor from a previously input list of vendors, and select CREATE GROUP to create the group.

Communicator Interface

The Communicator selector, when selected, brings up an interface having Inbox, Outbox, and Compose tabs. The Inbox tab shows communications received by the admin, which may be searched using a search bar and selected for export and/or deletion. The Outbox tab shows the same, except for outgoing communications from the admin. The Compose tab allows the admin to compose a message, including To, CC, BCC, Subject, and Body fields (which latter field includes font sizing, bold, italics, etc.). Files may also be attached, and a SEND button sends the message.

Alternative End User Interfaces

While several end user interfaces are shown in FIGS. 14-17, there are other end user interfaces which may be utilized. Some of these will be described below, though without further drawings as the practitioner of ordinary skill in the art will be able to implement these without further illustration. It should be noted that the end user may select and edit or change a profile photo (for example in FIG. 14E the mountain shown at the top is a user-selected profile image, and by selecting the camera icon immediately below this the profile photo may be changed to a stock image within the system or a user-selected image that is browsed to or saved on the end user device).

In some implementations the end user interface home screen, immediately after logging in, shows all the latest news feed items that have been published and that are within the end user's geographic area. A menu selector at the top left (three bars) brings up a menu which includes: Profile; Home; Preparedness Information; Emergency Plan; Active Shooter; Are we Safe; Nearby Place; Favorite Place; Resources; Privacy Policy; 911; and Logout selectors. One or more badges are also shown for profile completion and/or Are we Safe profile completion. The Profile selector allows a user to insert and edit profile information, previously described, including photo, and allows the user to set up alert locations (for example the location of the user and/or the user's of family members), which can later be deleted if desired. The Preparedness Information selector brings up all Preparedness Information items which have been published by the relevant admin, which the end user may select and read as desired. The Emergency Plan selector brings up all Emergency Plans that the relevant admin has published. The end user can open any of these and the checklist items will be listed with boxes for tapping to add a checkmark. Any list can be saved and returned to later and it will have the checkmarks that were previously added. In this way end users can go through the lists over time to increase their safety by implementing emergency plans.

The Active Shooter selector brings up a selector to indicate whether the end user has heard shots or not. If not (not a current active shooter situation) the end user is given general information about active shooter situations and how to respond. If the user has heard shots short instructions are given about running, hiding, and fighting at last resort. A Continue selector brings up a 911 link to call 911, brings up a link to the Are we Safe feature to check in with family, and brings up a selector to report an Active Shooter event through the app. A Submit button allows the reporting of an active shooter. The Are we Safe selector has the elements previously discussed above, and in implementations includes a radio selector to select whether a user is safe or not, a dropdown to select the reason (weather, shooter, disaster, not affected, etc.), and a CANCEL button to cancel or a SEND button to send the notification to all members of an end user defined group by SMS. The end user may have different groups for the Are we Safe feature, such as Family, Close Friends, Work, Church, etc., and upon opening the Are we Safe feature the user may select one or more of these groups to receive the message. From this interface the user may also create a new group and add participants as desired. The participants may need to first download the app and add themselves as users, then the end user may find and add them by using the email address they used on the app. If the end user sends a message that he/she is not safe, the recipient may receive instructions in an SMS message to immediately try calling the end user and, if no answer is received, to call 911 on their behalf.

The Nearby Place selector brings up a map (which may be a third party map such as a GOOGLE MAPS map) which includes a search bar to search for anything nearby, such as hotels, drug stores, supermarkets, shelters, etc. From the map the end user may "favorite" locations, such as the nearest drugstore, gas station, hospital, general contractor, etc., or such locations along some direction of travel. The Favorite Place selector brings up a map (which again may be a third party app) and pinpoints on the map the locations the end user has set as their favorite places, so that during an emergency the end user can simply pull up the favorite places that may be useful during an emergency, such as evacuation places (residence or hotel), emergency shelters, pharmacies, schools, doctors, banks, etc.

The Resources selector brings up a list of topics which may be expanded and which may include links and/or other functionality, such as a Hospitals selector which brings up a map showing nearby hospitals, and another for nearby pharmacies, urgent cares, hotels, gas stations, ATMs, hardware stores, etc. A traffic selector brings up a map which may show current traffic conditions. A Resilience selector may bring up information on resilience, and so forth.

The Privacy Policy selector brings up the privacy policy of the admin or owner of the system/software. The 911 selector dials 911 for the user to press the phone call icon to send the call. The Logout selector logs the end user out.

Other implementations may have other features, menu items, and the like.

In some implementations of admin interfaces a corporate admin may not have all of the same menu items as an overall admin has—for example a corporate admin may only have the Publish, Member, User Group, and Communicator menu items, with the overall admin handling other items for the corporate admin. In implementations of systems and methods that involve corporate (or government) entities, the system/method includes a business to business model. There will be a unique identifier associated with the business or entity, so end users associated with the business or entity will have a profile using that unique identifier and will receive notifications that the business or entity itself sends out. The end user experience is the same except that the business or entity would send out business-specific messages to those in that group. Those in that group may also receive other messages for those outside the business group that are available to all persons (such as emergency weather notifications, etc.). Those notifications from within the business may be related to end users' jobs, such as notifications related to their job at an airport, nuclear power plant, chemical facility, hydroelectric dam, etc., in other words, businesses may be able to notify employees through the app of potentially dangerous situations, or evacuation needs, etc., based on their specific situation.

In implementations an admin may input, using one of the admin interfaces, a geographic zone of an emergency so that the geographic zone is received at the servers for processing alerts to end users. In other implementations the geographic zone of an emergency may be received by a third-party provider such as a weather notification or the like. In either case, the server(s) and/or other system elements can, using the current and/or projected geographic zones of the emergency, determine a subset of end users whose geographic locations (stored/selected locations and/or current GPS locations) overlap with the current and/or projected geographic zone of the emergency for sending out notifications/alerts to end users who could be affected by the emergency.

In places where the phrase "one of A and B" is used herein, including in the claims, wherein A and B are elements, the phrase shall have the meaning "A or B." This shall be extrapolated to as many elements as are recited in this manner, for example the phrase "one of A, B, and C" shall mean "A, B, or C," and so forth.

In places where the description above refers to specific embodiments of emergency preparation and response systems and related methods, one or more or many modifications may be made without departing from the spirit and scope thereof. Details of any specific embodiment/implementation/interface described herein may, wherever possible, be applied to any other specific implementation/embodiment/interface described herein.

What is claimed is:

1. An emergency preparation and response system, comprising:
    one or more databases communicatively coupled with one or more first computing devices;
    one or more user interfaces, displayed on the one or more first computing devices, comprising input fields configured to, in response to receiving one or more preliminary admin inputs, store one or more potential future emergency types in the one or more databases, store one or more emergency descriptions in the one or more databases, and associate each potential future emergency type with one of the emergency descriptions through the one or more databases;
    one or more second computing devices communicatively coupled with the one or more databases;
    one or more user interfaces, displayed on the one or more second computing devices, comprising input fields configured to, in response to receiving one or more user inputs, store one or more user profiles in the one or more databases, each user profile comprising a geographic location; and
    one or more user interfaces, displayed on a subset of the one or more second computing devices associated with end users whose geographic locations fall within a geographic zone affected by an actual emergency, displaying one of the potential future emergency types matching the actual emergency and one of the emergency descriptions matching the actual emergency;
    wherein the one or more preliminary admin inputs are not configured to initiate communication of the one or more potential future emergency types to any individual; and
    wherein the one or more preliminary admin inputs include one or more inputs configured to associate one or more images with the one or more potential future emergency types, associate a uniform resource locator (URL) with the one or more potential future emergency types, and associate one or more checklists with the one or more potential future emergency types.

2. The system of claim 1, further comprising displaying, on the one or more user interfaces displayed on the subset of the one or more second computing devices associated with end users whose geographic locations fall within the geographic zone affected by the actual emergency, the one or more images, the URL, and the one or more checklists.

3. An emergency preparation and response method, comprising:
    providing one or more databases communicatively coupled with one or more first computing devices;
    displaying, on the one or more first computing devices, one or more admin user interfaces;
    in response to receiving one or more preliminary admin inputs using the one or more admin user interfaces, storing a plurality of potential future emergency types in the one or more databases, storing a plurality of emergency descriptions in the one or more databases, and associating each potential future emergency type with one of the emergency descriptions through the one or more databases;
    displaying, on a plurality of second computing devices communicatively coupled with the one or more databases through a telecommunications network, one or more end user interfaces;
    in response to receiving user input using the one or more end user interfaces, storing a plurality of user profiles in the one or more databases;
    in response to one of receiving user input using the one or more end user interfaces and receiving GPS locations of the plurality of second computing devices, storing a plurality of geographic locations in the one or more databases, and associating each user profile with one of the geographic locations;
    receiving, at one or more servers coupled with the one or more databases, a geographic zone of an actual emergency;
    determining, using the one or more servers, a subset of end users whose geographic locations overlap with the geographic zone of the actual emergency; and
    in response to a push notification sent from the one or more servers, displaying, on the second computing devices of the subset of end users, one of the potential future emergency types matching the actual emergency and one of the emergency descriptions associated through the one or more databases with the potential future emergency type;
    wherein receiving, at the one or more servers coupled with the one or more databases, the geographic zone of the actual emergency, comprises receiving a weather alert from a remote server, and wherein the push notification is automatically sent to the second computing devices of the subset of end users in response to receipt of the weather alert from the remote server; and
    wherein the push notification includes a draft news feed item saved in the one or more databases prior to receipt of the weather alert from the remote server, wherein the draft news feed item is associated through the one or more databases with a weather emergency type that matches a weather emergency type indicated by the weather alert.

* * * * *

UNITED STATES PATENT AND TRADEMARK OFFICE
CERTIFICATE OF CORRECTION

PATENT NO. : 10,904,696 B2
APPLICATION NO. : 16/250840
DATED : January 26, 2021
INVENTOR(S) : Patrick F. Williams and Sarah B. Smith It is certified that error appears in the above-identified patent and that said Letters Patent is hereby corrected as shown below:

In the Specification

Column 23, Line 51, replace "user's of family members" with -user's family members-.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*